(12) United States Patent
Sharma

(10) Patent No.: US 11,538,013 B1
(45) Date of Patent: Dec. 27, 2022

(54) METHODS, APPARATUSES, AND SYSTEMS FOR USER ACCOUNT-AFFILIATED PAYMENT AND BILLING, CONSOLIDATED DIGITAL BILLER-PAYMENT WALLETS

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 0 days.

(21) Appl. No.: 17/336,427

(22) Filed: Jun. 2, 2021

(51) Int. Cl.
*G06Q 20/22* (2012.01)
*G06Q 20/10* (2012.01)
*G06Q 20/36* (2012.01)

(52) U.S. Cl.
CPC ......... *G06Q 20/227* (2013.01); *G06Q 20/102* (2013.01); *G06Q 20/363* (2013.01); *G06Q 20/3674* (2013.01)

(58) Field of Classification Search
None
See application file for complete search history.

(56) References Cited

U.S. PATENT DOCUMENTS

| | | | |
|---|---|---|---|
| 6,873,974 | B1 | 3/2005 | Schutzer |
| 2002/0091646 | A1 | 7/2002 | Lake et al. |
| 2002/0128977 | A1 | 9/2002 | Nambiar et al. |
| 2003/0096596 | A1 | 5/2003 | Sini et al. |
| 2006/0229985 | A1 | 10/2006 | Lalwani et al. |
| 2007/0244811 | A1 | 10/2007 | Tumminaro |
| 2007/0255652 | A1 | 11/2007 | Tumminaro et al. |
| 2009/0104888 | A1 | 4/2009 | Cox |
| 2009/0119190 | A1 | 5/2009 | Realini |
| 2009/0132392 | A1 | 5/2009 | Davis et al. |
| 2013/0006848 | A1 | 1/2013 | Kuttuva |
| 2013/0238455 | A1 | 9/2013 | Laracey |
| 2013/0254115 | A1 | 9/2013 | Pasa et al. |
| 2013/0346302 | A1 | 12/2013 | Purves et al. |

(Continued)

OTHER PUBLICATIONS

International Search Report and Written Opinion for PCT/US2021/035418 (ISA/US) dated Sep. 9, 2021 (18 pages).

*Primary Examiner* — Namrata Boveja
*Assistant Examiner* — Amit Patel
(74) *Attorney, Agent, or Firm* — Alston & Bird LLP

(57) ABSTRACT

Described are systems, apparatuses, methods, and computer program products for low-input initiation of user account-affiliated transactions. An example apparatus can comprise a processor and a memory storing program code configured to cause the apparatus to store payor information, authentication information, and account information associated with a payor; store payee information associated with payees; receive, from a payee device or a payor device, a request to initiate a payment, the request comprising information about a payor and payee as well as a payment amount; determine, based at least upon the information about the payor and payee, and the stored information, whether the payment is to a pre-approved payee or merchant with which payor has a pre-existing account; and, in an instance in which the determination is in the affirmative, initiate the payment by providing at least payor and payee information and payment amount a payment processor.

30 Claims, 5 Drawing Sheets

(56) References Cited

U.S. PATENT DOCUMENTS

| | | | |
|---|---|---|---|
| 2014/0236838 A1* | 8/2014 | Asar | G06Q 20/385 |
| | | | 705/71 |
| 2015/0170141 A1 | 6/2015 | Klingen | |
| 2016/0285816 A1* | 9/2016 | Schmid | H04L 51/02 |
| 2019/0087816 A1* | 3/2019 | Jamkhedkar | G06Q 20/385 |
| 2021/0117965 A1* | 4/2021 | Venot | G06Q 20/34 |

\* cited by examiner

METHODS, APPARATUSES, AND SYSTEMS FOR USER ACCOUNT-AFFILIATED PAYMENT AND BILLING, CONSOLIDATED DIGITAL BILLER-PAYMENT WALLETS

FIELD OF THE INVENTION

The present disclosure relates generally to methods and apparatuses for secure payment processing and billing, and more particularly to methods and apparatuses for user account-affiliated digital biller-payments wallets and cards for carrying out secure payment processing and billing.

BACKGROUND

Conventional systems, methods, and apparatuses for initiating and processing payments in electronic commerce (e-commerce) and bill payment typically require users (e.g., payors) to remember and input authentication indicia or enter personal information before initiating a payment. For instance, some conventional approaches require users to initially register with and later securely sign into disparate, secured payment processing portals to complete encrypted transactions or initiate encrypted payment processes. In other instances, some conventional approaches require users to enter some or all of their pertinent personally identifying information (PII), bill or account information, transaction information, and payment details (e.g., name on their payment card, payment card number, billing address associated with their payment card, the expiration date of their payment card, a card verification value (CVV) printed on their payment card, etc.) to initiate or complete a secure payment or transaction.

Some other conventional systems may rely on a single server to store all the personal details in a secure digital wallet. However, a single server may not have all the personal details or the server may not be set up to accept additional details the user may want to store or the user may be reluctant to store some personal details at a single server. Moreover, depending on the security mechanism provided by a single server storing all the confidential user information may ease breaking into the server that may compromise the user information. In other systems, such as those described in U.S. patent application Ser. No. 14/663,840, entitled "Systems and Methods for Creating and Accessing Electronic Wallet," the entire disclosures of which are hereby incorporated herein by reference in their entireties for all purposes, may benefit from using a secure digital wallet in which the personal details and transaction details can be maintained. However, conventional payment processing systems, such as those that use conventional digital wallets may be used for facilitating payments or financial transactions between a user associated with the digital wallet and any vendor, merchant, payee, or the like. As such, if an unauthorized person or device gains access to the payment processing systems or digital wallet, the unauthorized person or device could illicitly obtain the user's personally identifying information and financial information, initiate unauthorized purchases and transactions, and/or transfer funds out of the user's account.

BRIEF SUMMARY

It will be understood that this disclosure is not limited to the particular system and methodologies described, as there can be multiple possible embodiments of the present disclosure that are not expressly illustrated in the present disclosure. It is also to be understood that the terminology used in the description is for the purpose of describing the particular versions or embodiments only, and is not intended to limit the scope of the present disclosure.

Described herein are systems, apparatuses, methods, and computer program products for simple and secure initiation of payments and financial transactions.

According to some embodiments, a user account-affiliated digital wallet system is provided, the system comprising a user device, a merchant device, and means for initiating a payment or other such transaction, such as a transaction initiation device. The transaction initiation device may comprise a processor and memory device storing program code. In some embodiments, the memory device and the program code are configured, with the processor, to cause the transaction initiation device to store at least user account information in a digital wallet. Other information, such as a user's account information for one or more merchants, authentication indicia, personally identifying information, payment option details, credit and/or debit card details, bank account information, user payment preferences or requirements, merchant payment preferences or requirements, and/or the like may also be stored in the digital wallet. In some embodiments, the transaction initiation device may store the digital wallet locally or remotely, in a singular location or in plural locations. For instance, the digital wallet may store some information in an encrypted format while storing other information in a non-encrypted format.

According to some embodiments, the transaction initiation device may receive a purchase request, from the user device, another device associated permanently or temporarily with the user, the merchant device, another device associated permanently or temporarily with a merchant, an unknown device, or the like. The purchase request can be as simple as including an indication of a payor, an indication of a payee, and a payment amount. The purchase request may alternatively include other information, such as personally identifying information (PII) associated with the user, a request for authentication indicia from the user, contextual information about the reason or cause for the payment, or the like. In some embodiments, the purchase request may provide an identifying value such as a merchant-side account number in lieu of a payor name or other PII. In such an instance, the transaction initiation device may query a set of digital wallets or otherwise reference a set of information about plural users to associate the provided identifying value with a particular user. In some embodiments, the payment request may include a merchant/payee account information in lieu of a merchant name or other merchant information necessary to carry out the payment or transaction. In such an instance, the transaction initiation device may query the set of digital wallets or a separate merchant dataset to associate the provided merchant/payee account information with the merchant name or other merchant information necessary to carry out the payment or transaction. In some embodiments, user payment preferences or user payment requirements may be stored in the digital wallet or referenceable by the transaction initiation device during initiation of the payment or transaction.

According to some embodiments, the digital wallet may be configured to only participate in payment or transaction processing for payment to merchants with which the user/payor has an account, and only for payments/transactions associated with said account. In some embodiments, the digital wallet may be configured to only participate in financial transactions when the financial transactions are designated for payment of an outstanding bill associated with a user account with the payee. In some embodiments, the transaction initiation device may be configured to, upon receiving a payment or transaction request, determine if the payee or merchant indicated in or associated with the payment or transaction request is a merchant or payee with which the user/payor has an account.

In some embodiments, even if a purchase request, bill payment request, financial transaction request, or the like, originates from an unknown entity, the transaction initiation device and/or digital wallet may be configured to still initiate and/or carry out the purchase, bill payment, financial transaction, or the like. For example, the transaction initiation device and/or digital wallet may determine, from the purchase request, bill payment request, financial transaction request, or the like, the identity of the user associated with the digital wallet, the merchant/payee to which the money or other currency for the purchase, bill payment, financial transaction, or the like are directed, and the amount of money or other currency being requested. Once the transaction initiation device and/or digital wallet determines the identity of the user/payor and the identity of the merchant/payee, the transaction initiation device and/or digital wallet can reference a database or set of pre-authorized merchant accounts associated with the user and determine if the merchant/payee identified in the request is associated with one of the pre-authorized merchant accounts. In an instance in which the transaction initiation device and/or digital wallet determines that the merchant/payee identified in the request is associated with a pre-authorized merchant account, the transaction initiation device and/or digital wallet can automatically initiate the transaction or automatically provide all necessary transaction details to a payment processor to cause the payment processor to carry out the purchase, bill payment, financial transaction, or the like.

In other embodiments, the transaction initiation device and/or digital wallet may be configured to receive, store, retrieve, or otherwise determine user payment preferences, user payment requirements, user payment type requirements, or the like. In other embodiments, the transaction initiation device and/or digital wallet may be configured to receive, store, retrieve, or otherwise determine, for one, some, or all merchants, merchant payment preferences, merchant payment requirements, merchant payment type requirements, or the like. In some embodiments, the user payment preferences may include a particular type of payment method or a particular payment method preferred for use with one, some, or all merchants. In some embodiments, the merchant payment preferences may include a particular type of payment method or a particular payment method preferred by one, some, or all merchants. In some embodiments, the In another embodiment, a user account-affiliated payment card is provided. The payment card can have dimensions substantially similar to that of a conventional credit card or debit card. In some embodiments, the payment card can comprise one or more of: a card number, a cardholder name, an expiry date, a security chip, a Europay, MasterCard® and Visa® (EMV®) chip, a magnetic strip, a CVV number, a dynamic CVV number, a near field communication (NFC) transmitter, inductive coupling antennas, and/or the like. The payment card can store information regarding one or more merchant accounts associated with one or more merchants. The payment card is configured to initiate payment with a merchant associated with the one or more merchant accounts. For example, a user may associate their payment card with one or more merchant accounts and provide at least one payment method to be stored on the payment card.

A payment method can include another payment card, such as a credit card or a debit card, a bank account, an e-payment account such as a PayPal® account, a cryptocurrency, an electronic currency, a token having value, cash, e-wallet funds, non-fungible tokens, a stored-value card, electronic bank transfers, Apple Pay®, Google Pay®, AndroidPay®, or the like. In some embodiments, at least a portion of the digital wallet can be or comprise a pass-through digital wallet or a stored-value digital wallet. In some embodiments, a portion of the information stored on the payment card (e.g., on an embedded chip or the like) can be encrypted while other portion(s) of the information stored on the payment card can be non-encrypted.

By way of example only, a user may use a payment card, such as described herein, to purchase a product or service, pay a bill or invoice, initiate a financial transaction, or the like. However, according to some embodiments, the payment card can be user account-affiliated such that it is only configured for initiating payments, purchases, or financial transactions in association with a merchant account associated with the user. The set of merchant information may be dynamically updated to add or remove merchant accounts associated with the user. Since the payment card according to some embodiments is configured to only initiate payments, purchases, or financial transactions with pre-authorized merchants, and only in regard to accounts at these pre-authorized merchants that are associated with the user, any person or device that gains unauthorized access to the user's payment card would only be able to complete purchases or payments regarding the user's own accounts. For example, the user may have an account with a local natural gas supply company, and therefore the local natural gas supply company may be designated as a pre-authorized merchant for the user's digital wallet and the user's payment card. In an instance in which the local natural gas supply company is the only merchant pre-authorized for the user's digital wallet and the user's payment card, both the user's digital wallet and the user's payment card are secured against any transaction with any other merchant, even with other merchants with which the user has a legitimate account. As such, even if the user's digital wallet or the user's payment card was accessed by an unauthorized person or device, the unauthorized person or device would only be able to make payments, from any of the user's stored payment methods, to the user's account with the local natural gas supply company. Other financial transactions, such as the transfer of funds to an external account, or even between the user's different payment methods stored at the digital wallet or on the payment card, the purchase of any product or service with any other merchant, or any other payments are completely disallowed, even by the user, no matter what authentication information or other authorization commands are provided.

According to some embodiments, the digital wallet and/or the payment card can be configured such that additional merchants and/or additional user account with merchants can only be authorized for the digital wallet and/or the payment card through an authorization process that requires additional security measures such as two-factor authentication, biometric screening, or the like.

In another embodiment, an apparatus can be provided that is configured for secure payment processing, the apparatus comprising: one or more processors; and one or more memory devices storing program code, the one or more memory devices and the program code being configured, with the one or more processors, at least to: store, in a digital wallet associated with a user, information regarding one or more payment options associated with the user, and information regarding one or more merchant accounts associated with the user; receive a request to initiate a payment between the user and a payee; determine, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiate the payment to the particular merchant account according to one of the one or more payment options associated with the user. In some embodiments, the one or more memory devices and the program code are further configured, with the one or more processors, at least to: store user payment preferences associated with the one or more merchant accounts and the one or more payment options. In some embodiments, the one or more memory devices and the program code are further configured, with the one or more processors, at least to: determine, based upon at least the user payment preferences, a particular payment option from among the one or more payment options to be used for the payment; and provide, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the one or more memory devices and the program code are further configured, with the one or more processors, at least to: store merchant transaction requirements associated with the one or more merchant accounts, the merchant transaction requirements comprising one of: one or more allowed types of payment source, or one or more disallowed types of payment source. In some embodiments, the one or more memory devices and the program code are further configured, with the one or more processors, at least to: determine, based upon at least the merchant transaction requirements, a particular payment option from among the one or more payment options to be use for the payment; and provide, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the one or more memory devices and the program code are further configured, with the one or more processors, at least to: in an instance in which the determination is in the affirmative, provide a notification to a user device or a device associated with said particular merchant account that the payment has been initiated. In some embodiments, the one or more memory devices and the program code are further configured, with the one or more processors, at least to: in an instance in which the determination is in the negative, provide a notification to a user device or a device associated with said particular merchant account that the payment is disallowed and refrain from initiating the payment with the payment processor.

In still another embodiment, an apparatus can be provided that is configured for secure payment processing, the apparatus comprising means, such as one or more processors and one or more memory devices storing program code, for storing, in a digital wallet associated with a user, information regarding one or more payment options associated with the user, and information regarding one or more merchant accounts associated with the user; means for receiving a request to initiate a payment between the user and a payee; means for determining, based upon at least the information regarding one or more merchant accounts associated with the user, whether the payee is associated with a particular merchant account of the one or more merchant accounts associated with the user; and means for, in an instance in which the payee is associated with a particular merchant account of the one or more merchant accounts associated with the user, initiating the payment to the particular merchant account according to one of the one or more payment options associated with the user. In some embodiments, the apparatus can further comprise means for storing user payment preferences associated with the one or more merchant accounts and the one or more payment options. In some embodiments, the apparatus can further comprise means for determining, based upon at least the user payment preferences, a particular payment option from among the one or more payment options to be used for the payment; and means for providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the apparatus can further comprise means for storing merchant transaction requirements associated with the one or more merchant accounts, the merchant transaction requirements comprising one of: one or more allowed types of payment source, or one or more disallowed types of payment source. In some embodiments, the apparatus can further comprise means for determining, based upon at least the merchant transaction requirements, a particular payment option from among the one or more payment options to be use for the payment; and means for providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the apparatus can further comprise means for, in an instance in which the determination is in the affirmative, providing a notification to a user device or a device associated with said particular merchant account that the payment has been initiated. In some embodiments, the apparatus can further comprise means for, in an instance in which the determination is in the negative, providing a notification to a user device or a device associated with said particular merchant account that the payment is disallowed and refraining from initiating the payment with the payment processor.

According to another embodiment, a method for secure payment processing can be carried out, the method comprising: storing, in a digital wallet associated with a user, information regarding one or more payment options associated with the user, and information regarding one or more merchant accounts associated with the user; receiving a request to initiate a payment between the user and a payee; determining, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiating the payment to the particular merchant account according to one of the one or more payment options associated with the user. In some embodiments, the method can further comprise: storing user payment preferences associated with the one or more merchant accounts and the one or more payment options. In some embodiments, the method can further comprise: determining, based upon at least the user payment preferences, a particular payment option from among the one or more payment options to be used for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the method can further comprise: storing merchant transaction requirements associated with the one or more merchant accounts, the merchant transaction requirements comprising one of: one or more allowed types of payment source, or one or more disallowed types of payment source. In some embodiments, the method can further comprise: determining, based upon at least the merchant transaction requirements, a particular payment option from among the one or more payment options to be use for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the method can further comprise: in an instance in which the determination is in the affirmative, providing a notification to a user device or a device associated with said particular merchant account that the payment has been initiated. In some embodiments, the method can further comprise: in an instance in which the determination is in the negative, providing a notification to a user device or a device associated with said particular merchant account that the payment is disallowed and refraining from initiating the payment with the payment processor.

According to still another embodiment, a computer program product can be provided that comprises a non-transitory computer readable medium storing program instructions, the program instructions being operable for causing at least: storing, in a digital wallet associated with a user, information regarding one or more payment options associated with the user, and information regarding one or more merchant accounts associated with the user; receiving a request to initiate a payment between the user and a payee; determining, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiating the payment to the particular merchant account according to one of the one or more payment options associated with the user. In some embodiments, the program instructions are further operable for causing at least: storing user payment preferences associated with the one or more merchant accounts and the one or more payment options. In some embodiments, the program instructions are further operable for causing at least: determining, based upon at least the user payment preferences, a particular payment option from among the one or more payment options to be used for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the program instructions are further operable for causing at least: storing merchant transaction requirements associated with the one or more merchant accounts, the merchant transaction requirements comprising one of: one or more allowed types of payment source, or one or more disallowed types of payment source. In some embodiments, the program instructions are further operable for causing at least: determining, based upon at least the merchant transaction requirements, a particular payment option from among the one or more payment options to be use for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the program instructions are further operable for causing at least: in an instance in which the determination is in the affirmative, providing a notification to a user device or a device associated with said particular merchant account that the payment has been initiated. In some embodiments, the program instructions are further operable for causing at least: in an instance in which the determination is in the negative, providing a notification to a user device or a device associated with said particular merchant account that the payment is disallowed and refrain from initiating the payment with the payment processor.

According to yet another embodiment, an apparatus can be provided that is configured for secure payment processing, the apparatus comprising: one or more processors; and one or more memory devices storing program code, the one or more memory devices and the program code being configured, with the one or more processors, at least to: store at least payor information, authentication information, and account information associated with a payor; store at least payee information associated with one or more payees; receive, from a payee device or a payor device, a request to initiate a payment, the request comprising the payor information, the payee information associated with a particular payee of the one or more payees, and payment information regarding the payment; determine, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiate the payment by providing the payment information regarding the payment, the payor information, the payee information associated with the particular payee of the one or more payees, the authentication information, the account information, and the payment information regarding the payment to a payment processor. In some embodiments, the one or more memory devices and the program code are further configured, with the one or more processors, at least to: in an instance in which the determination is in the affirmative, provide a notification to the payee device or the payor device that the payment has been initiated. In some embodiments, the one or more memory devices and the program code are further configured, with the one or more processors, at least to: in an instance in which the determination is in the negative, provide a notification to the payee device or the payor device that the payment is disallowed and refrain from initiating the payment with the payment processor.

According to another embodiment, an apparatus can be provided that is configured for secure payment processing, the apparatus comprising means, such as one or more processors and one or more memory devices storing program code, for storing at least payor information, authentication information, and account information associated with a payor; means for storing at least payee information associated with one or more payees; means for receiving, from a payee device or a payor device, a request to initiate a payment, the request comprising the payor information, the payee information associated with a particular payee of the one or more payees, and payment information regarding the payment; means for determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and means for, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the apparatus can further comprise means for, in an instance in which the determination is in the affirmative, providing a notification to the payee device or the payor device that the payment has been initiated. In some embodiments, the apparatus can further comprise means for, in an instance in which the determination is in the negative, providing a notification to the payee device or the payor device that the payment is disallowed and refrain from initiating the payment with the payment processor.

According to still another embodiment, a method can be carried out that comprises: storing at least payor information, authentication information, and account information associated with a payor; storing at least payee information associated with one or more payees; receiving, from a payee device or a payor device, a request to initiate a payment, the request comprising the payor information, the payee information associated with a particular payee of the one or more payees, and payment information regarding the payment; determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the method can further comprise: in an instance in which the determination is in the affirmative, providing a notification to the payee device or the payor device that the payment has been initiated. In some embodiments, the method can further comprise: in an instance in which the determination is in the negative, providing a notification to the payee device or the payor device that the payment is disallowed and refraining from initiating the payment with the payment processor.

According to yet another embodiment, a computer program product can be provided that comprises a non-transitory computer readable medium storing program instructions, the program instructions being operable for causing at least: storing at least payor information, authentication information, and account information associated with a payor; storing at least payee information associated with one or more payees; receiving, from a payee device or a payor device, a request to initiate a payment, the request comprising the payor information, the payee information associated with a particular payee of the one or more payees, and payment information regarding the payment; determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the program instructions are further operable for causing at least: in an instance in which the determination is in the affirmative, providing a notification to the payee device or the payor device that the payment has been initiated. In some embodiments, the program instructions are further operable for causing at least: in an instance in which the determination is in the negative, providing a notification to the payee device or the payor device that the payment is disallowed and refraining from initiating the payment with the payment processor.

According to another embodiment, an apparatus can be provided that is configured for secure payment processing, the apparatus comprising: one or more processors; and one or more memory devices storing program code, the one or more memory devices and the program code being configured, with the one or more processors, at least to: store, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receive a request to initiate a payment between the user and the merchant, the request comprising at least: an indication of a payor, an indication of a payee, and a payment amount;

determine, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiate the payment. In some embodiments, the one or more memory devices and the program code are further configured, with the one or more processors, at least to: in an instance in which the determination is in the affirmative, automatically initiate the payment by providing at least a portion of the set of digital wallet data stored in the digital wallet and the payment amount to a payment processor. In some embodiments, the one or more memory devices and the program code are further configured, with the one or more processors, at least to: in an instance in which the determination is in the affirmative, provide a notification to one or both of a user device associated with the payor or a merchant device associated with the payee that the payment has been initiated. In some embodiments, the one or more memory devices and the program code are further configured, with the one or more processors, at least to: in an instance in which the determination is in the negative, provide a notification to one or both of a user device associated with the payor or a merchant device associated with the payee that the payment is disallowed and refrain from initiating the payment with the payment processor.

According to still another embodiment, an apparatus can be provided that is configured for secure payment processing, the apparatus comprising means, such as one or more processors and one or more memory devices storing program code, for storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; means for receiving a request to initiate a payment between the user and the merchant, the request comprising at least: an indication of a payor, an indication of a payee, and a payment amount; means for determining, based at least upon the indication of the payor, the indication of the payee, and the set of digital wallet data stored in the digital wallet, whether the payment being requested is to a pre-approved merchant account from among the plurality of merchant accounts; and means for, in an instance in which the determination is in the affirmative, automatically initiating the payment. In some embodiments, the apparatus can further comprise: means for, in an instance in which the determination is in the affirmative, automatically initiating the payment by providing at least a portion of the set of digital wallet data stored in the digital wallet and the payment amount to a payment processor. In some embodiments, the apparatus can further comprise: means for, in an instance in which the determination is in the affirmative, providing a notification to one or both of a user device associated with the payor or a merchant device associated with the payee that the payment has been initiated. In some embodiments, the apparatus can further comprise: means for, in an instance in which the determination is in the negative, providing a notification to one or both of a user device associated with the payor or a merchant device associated with the payee that the payment is disallowed and refraining from initiating the payment with the payment processor.

According to another embodiment, a method for secure payment processing can be carried out, the method comprising: storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receive a request to initiate a payment between the user and the merchant, the request comprising at least: an indication of a payor, an indication of a payee, and a payment amount; determining, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiating the payment. In some embodiments, the method can further comprise: in an instance in which the determination is in the affirmative, automatically initiating the payment by providing at least a portion of the set of digital wallet data stored in the digital wallet and the payment amount to a payment processor. In some embodiments, the method can further comprise: in an instance in which the determination is in the affirmative, providing a notification to one or both of a user device associated with the payor or a merchant device associated with the payee that the payment has been initiated. In some embodiments, the method can further comprise: in an instance in which the determination is in the negative, providing a notification to one or both of a user device associated with the payor or a merchant device associated with the payee that the payment is disallowed and refraining from initiating the payment with the payment processor.

According to still another embodiment, a computer program product can be provided that comprises a non-transitory computer readable medium storing program instructions, the program instructions being operable for causing at least: storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receiving a request to initiate a payment between the user and the merchant, the request comprising at least: an indication of a payor, an indication of a payee, and a payment amount; determining, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiating the payment. In some embodiments, the program instructions are further operable for causing at least: in an instance in which the determination is in the affirmative, automatically initiating the payment by providing at least a portion of the set of digital wallet data stored in the digital wallet and the payment amount to a payment processor. In some embodiments, the program instructions are further operable for causing at least: in an instance in which the determination is in the affirmative, providing a notification to one or both of a user device associated with the payor or a merchant device associated with the payee that the payment has been initiated. In some embodiments, the program instructions are further operable for causing at least: in an instance in which the determination is in the negative, providing a notification to one or both of a user device associated with the payor or a merchant device associated with the payee that the payment is disallowed and refraining from initiating the payment with the payment processor.

BRIEF DESCRIPTION OF THE DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
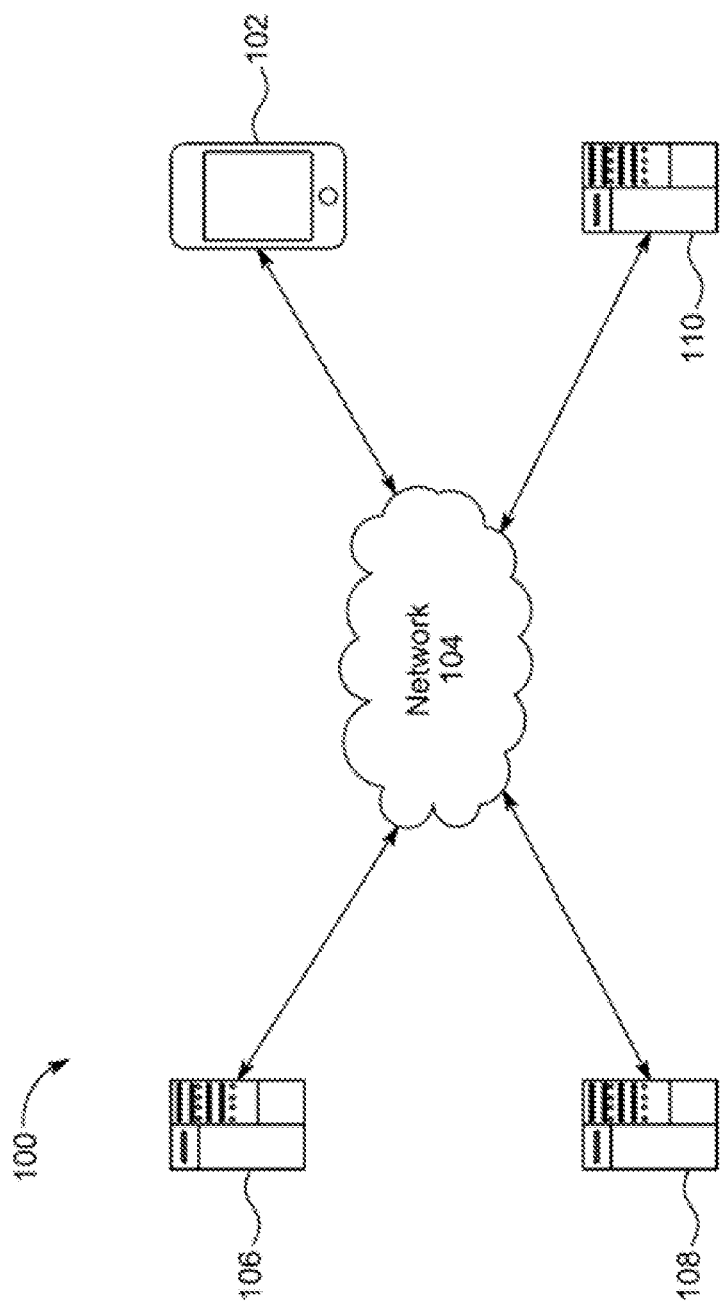
FIG. 1 illustrates a system for creating and accessing a digital wallet, in accordance with various embodiments.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Described herein are systems, apparatuses, methods, and computer program products for simple and secure initiation of payments and financial transactions.

According to some embodiments, a user account-affiliated digital wallet system is provided, the system comprising a user device, a merchant device, and means for initiating a payment or other such transaction, such as a transaction initiation device. The transaction initiation device may comprise a processor and memory device storing program code. In some embodiments, the memory device and the program code are configured, with the processor, to cause the transaction initiation device to store at least user account information in a digital wallet. Other information, such as a user's account information for one or more merchants, authentication indicia, personally identifying information, payment option details, credit and/or debit card details, bank account information, user payment preferences or requirements, merchant payment preferences or requirements, and/or the like may also be stored in the digital wallet. In some embodiments, the transaction initiation device may store the digital wallet locally or remotely, in a singular location or in plural locations. For instance, the digital wallet may store some information in an encrypted format while storing other information in a non-encrypted format.

According to some embodiments, the transaction initiation device may receive a purchase request, from the user device, another device associated permanently or temporarily with the user, the merchant device, another device associated permanently or temporarily with a merchant, an unknown device, or the like. The purchase request can be as simple as including an indication of a payor, an indication of a payee, and a payment amount. The purchase request may alternatively include other information, such as personally identifying information (PII) associated with the user, a request for authentication indicia from the user, contextual information about the reason or cause for the payment, or the like. In some embodiments, the purchase request may provide an identifying value such as a merchant-side account number in lieu of a payor name or other PII. In such an instance, the transaction initiation device may query a set of digital wallets or otherwise reference a set of information about plural users to associate the provided identifying value with a particular user. In some embodiments, the payment request may include a merchant/payee account information in lieu of a merchant name or other merchant information necessary to carry out the payment or transaction. In such an instance, the transaction initiation device may query the set of digital wallets or a separate merchant dataset to associate the provided merchant/payee account information with the merchant name or other merchant information necessary to carry out the payment or transaction. In some embodiments, user payment preferences or user payment requirements may be stored in the digital wallet or referenceable by the transaction initiation device during initiation of the payment or transaction.

According to some embodiments, the digital wallet may be configured to only participate in payment or transaction processing for payment to merchants with which the user/payor has an account, and only for payments/transactions associated with said account. In some embodiments, the digital wallet may be configured to only participate in financial transactions when the financial transactions are designated for payment of an outstanding bill associated with a user account with the payee. In some embodiments, the transaction initiation device may be configured to, upon receiving a payment or transaction request, determine if the payee or merchant indicated in or associated with the payment or transaction request is a merchant or payee with which the user/payor has an account.

In some embodiments, even if a purchase request, bill payment request, financial transaction request, or the like, originates from an unknown entity, the transaction initiation device and/or digital wallet may be configured to still initiate and/or carry out the purchase, bill payment, financial transaction, or the like. For example, the transaction initiation device and/or digital wallet may determine, from the purchase request, bill payment request, financial transaction request, or the like, the identity of the user associated with the digital wallet, the merchant/payee to which the money or other currency for the purchase, bill payment, financial transaction, or the like are directed, and the amount of money or other currency being requested. Once the transaction initiation device and/or digital wallet determines the identity of the user/payor and the identity of the merchant/payee, the transaction initiation device and/or digital wallet can reference a database or set of pre-authorized merchant accounts associated with the user and determine if the merchant/payee identified in the request is associated with one of the pre-authorized merchant accounts. In an instance in which the transaction initiation device and/or digital wallet determines that the merchant/payee identified in the request is associated with a pre-authorized merchant account, the transaction initiation device and/or digital wallet can automatically initiate the transaction or automatically provide all necessary transaction details to a payment processor to cause the payment processor to carry out the purchase, bill payment, financial transaction, or the like.

In other embodiments, the transaction initiation device and/or digital wallet may be configured to receive, store, retrieve, or otherwise determine user payment preferences, user payment requirements, user payment type requirements, or the like. In other embodiments, the transaction initiation device and/or digital wallet may be configured to receive, store, retrieve, or otherwise determine, for one, some, or all merchants, merchant payment preferences, merchant payment requirements, merchant payment type requirements, or the like. In some embodiments, the user payment preferences may include a particular type of payment method or a particular payment method preferred for use with one, some, or all merchants. In some embodiments, the merchant payment preferences may include a particular type of payment method or a particular payment method preferred by one, some, or all merchants.

In another embodiment, a user account-affiliated payment card is provided. The payment card can have dimensions substantially similar to that of a conventional credit card or debit card. In some embodiments, the payment card can comprise one or more of: a card number, a cardholder name, an expiry date, a security chip, a Europay, MasterCard® and Visa® (EMV®) chip, a magnetic strip, a CVV number, a dynamic CVV number, a near field communication (NFC) transmitter, inductive coupling antennas, and/or the like. The payment card can store information regarding one or more merchant accounts associated with one or more merchants. The payment card is configured to initiate payment with a merchant associated with the one or more merchant accounts. For example, a user may associate their payment card with one or more merchant accounts and provide at least one payment method to be stored on the payment card. A payment method can include another payment card, such as a credit card or a debit card, a bank account, an e-payment account such as a PayPal® account, a cryptocurrency, an electronic currency, a token having value, cash, e-wallet funds, non-fungible tokens, a stored-value card, electronic bank transfers, Apple Pay®, GooglePay®, AndroidPay®, or the like. In some embodiments, at least a portion of the digital wallet can be or comprise a pass-through digital wallet or a stored-value digital wallet. In some embodiments, a portion of the information stored on the payment card (e.g., on an embedded chip or the like) can be encrypted while other portion(s) of the information stored on the payment card can be non-encrypted.

By way of example only, a user may use a payment card, such as described herein, to purchase a product or service, pay a bill or invoice, initiate a financial transaction, or the like. However, according to some embodiments, the payment card can be user account-affiliated such that it is only configured for initiating payments, purchases, or financial transactions in association with a merchant account associated with the user. The set of merchant information may be dynamically updated to add or remove merchant accounts associated with the user. Since the payment card according to some embodiments is configured to only initiate payments, purchases, or financial transactions with pre-authorized merchants, and only in regard to accounts at these pre-authorized merchants that are associated with the user, any person or device that gains unauthorized access to the user's payment card would only be able to complete purchases or payments regarding the user's own accounts. For example, the user may have an account with a local natural gas supply company, and therefore the local natural gas supply company may be designated as a pre-authorized merchant for the user's digital wallet and the user's payment card. In an instance in which the local natural gas supply company is the only merchant pre-authorized for the user's digital wallet and the user's payment card, both the user's digital wallet and the user's payment card are secured against any transaction with any other merchant, even with other merchants with which the user has a legitimate account. As such, even if the user's digital wallet or the user's payment card was accessed by an unauthorized person or device, the unauthorized person or device would only be able to make payments from any of the user's stored payment methods to the user's account with a known merchant, such as the local natural gas supply company. According to some embodiments, other financial transactions or transactions of value, such as the transfer of funds to an external account, or the transfer of funds between the user's different payment methods stored at the digital wallet or on the payment card, the purchase of any product or service with any other merchant, or any other payments are completely disallowed, even by the user, no matter what authentication information or other authorization commands are provided. In other embodiments, such other financial transactions that are not payments from a pre-authorized user payment option or user account, to a user's account with a known merchant or vendor, may be carried out using the digital wallet, but only using a second tier of authentication information beyond or in addition to any basic authentication process required for transactions between a user payment option stored in the digital wallet and a user's account with a known merchant based on biller information stored in the wallet.

According to some embodiments, the digital wallet and/or the payment card can be configured such that additional merchants and/or additional user accounts with merchants can only be authorized for the digital wallet and/or the payment card through an authorization process that requires additional security measures such as two-factor authentication, biometric screening, or the like.

Referring now to FIG. 1, a block diagram illustrates a system 100 for creating and accessing a digital wallet, such as a user account-affiliated digital wallet, in accordance with various embodiments. A digital wallet generally includes at least transaction information and personal information of a user. The transaction information and personal information of a user may comprise billing address, shipping address, bank account details, credit card details, debit card details, gift card details, coupon codes, gift vouchers, loyalty points information, and/or the like. Various novel aspects of the disclosed system, apparatus, method, and computer program product may be implemented in a plurality of ways. The following description describes the invention according to possible example embodiments.

According to the first example embodiment, the system 100 includes a user device 102, a transaction facilitation device 106, and a merchant device 108. Though FIG. 1 depicts only one merchant device 108, it is to be understood that a plurality of merchant devices, such as merchant servers, merchant chatbots, or the like, can be connected to the transaction facilitation device 106 that can be accessed according to the various aspects of the present disclosure. The user device 102, the transaction facilitation device 106, and the merchant device 108 are communicatively coupled with each other by means of a network 104, such as internet.

The user device 102 enables a user to interact with the merchant device 108 relating to a marketplace, service provider, an e-commerce web site for browsing through various products or services provided by the server. The merchant device 108 may in turn be connected to one or more databases (not depicted in the figure) for storing information related to various products or services that are made available to the user for purchase. Moreover, the one or more databases connected to the merchant device 108 may store information related to the user such as a user profile.

The user device 102 enables the user to select a product or service required by the user for purchasing. The user device 102 also includes at least one input means and an output means for providing user input and to display one or more information to the user. The user device 102 may include input means such as keyboard, mouse, touch pad, digital pen, voice input device, touch input device, and the like. The user device 102 may include output means such as a display, speakers, printer, and the like. The user device 102 may include one or more storage means such as a hard disk, main memory, flash memory, cloud based storage, and the like, that may be coupled with a processor. The user device 102 is configured to run an operating system, a software program and one or more software applications by means of the processor. In another embodiment, the user device 102 may include a software component that can be included as part of the operating system or can be included later as a software download. It will be apparent to a person having ordinary skills in the art that the disclosed embodiments can be implemented for a variety of user devices including, but not limited to, a desktop computer, a laptop, a tablet computer, a mobile phone, a smartphone, and the like. In an aspect, the method described in the present disclosure may be embedded in one or more applications such as a web browser or any other applications by means of a software development kit. The user device 102 at the time of checkout, i.e., while paying for the selected product or service or bill, may be required to input transaction information for executing the payment. Such input of transaction information according to an embodiment may be divided into two main steps namely authentication/authorization and data extraction. The method for authentication and the step of data extraction may be processed by a plurality of servers communicatively coupled with the server executing the payment and therefore requiring the transaction information. Where the method described by the present disclosure is stored as a plug-in to the web browser of the user device, the plug-in may prompt the user to perform the payment transaction through the same. In such a case, the user device 102 by means of such a plug-in or any other program code may perform the transaction by exchanging information between the transaction facilitation device 106, merchant device 108, and other devices such as an authentication server 110.

The merchant device 108 relates to an account of the user. The merchant device 108 may store a digital wallet associated with the user. The merchant device 108 may relate to one or more accounts associated with the user, a mobile phone account of the user, and the like. The authentication server 110 may be configured to authenticate that the user conducting the transaction is the user to which the account being used by the transaction facilitation device 106 to process the transaction is associated. In some embodiments, to set up the transaction facilitation device 106 to include payment information or user account information, the transaction facilitation device 106 may generate a one-time password that may be sent to the user's mobile phone number or to the user's email that is registered with the user account present in the transaction facilitation device 106. In some embodiments, the transaction facilitation device 106 may require the user to enter certain personal information such as a password associated with the account being added, the zip code of the user, mobile phone number, or any other information by which the user may be authenticated. In some embodiments, the transaction facilitation device 106 may require the user to enter biometric data, such as a fingerprint, facial scan, iris scan, or the like. Upon authorization, the transaction facilitation device 106 may or may not provide personal information and transaction information of the user based on certain regulatory rules or certain security rules. In some embodiments, the transaction facilitation device 106 may provide a first set of information which may be certain personal information, transactional information, and the like. In some embodiments, the first set of information provided by the authentication server may be a unique token for ascertaining that the user has been authenticated and the first information might not comprise any user information. In the same regard, the digital wallet may store unique tokens associated with the user device, the user accounts associated with the merchants, the merchants themselves, the user's payment methods, or the like.

The transaction facilitation device 106 may store one or more personal information regarding the user including user name, user's shipping address, user's billing address, email address, phone number(s), credit card information, bank account information and the like that may be provided to the merchant device 108 or a payment processor (not shown) for executing the transaction. In some embodiments, the transaction facilitation device 106 may store and provide all the information required for completing the transaction. However, the transaction facilitation device 106 may not have all the information required for processing a transaction. For example, an authentication server related to a mobile phone account of the user may store or automatically procure billing address information of the user but may not store the shipping address of the user. In another example, an authentication server related to a social media account may store the contact details of the user and may not store the billing information of the user. Even after authorization the user information may not be automatically sent to the server executing the payment which is different from the transaction facilitation device 106 due to issues such as PCI compliance issues, regulatory issues, security concerns, and the like. Hence, the missing details required for a transaction are either retrieved from the authentication server 110, or retrieved from the merchant device 108. In some embodiments, the missing details required for a transaction may be provided by the user. In some embodiments, the transaction facilitation device 106 may provide stored information regarding the user, such as personally identifying information, that may be used for a transaction, while other information that is missing, such as merchant account information, may be queried, received, or procured from the merchant device 108.

The merchant device 108 may maintain certain personal and transactional information of the user. The merchant device 108 may be connected to one or more secure databases that store the personal and transactional information of the user. The transactional information may include but not be limited to user's name, user's address, email address, phone number(s), and the like. In an example, the merchant device 108 may be related to one or more e-commerce websites or applications on which the user is registered. The merchant device 108 may also relate to one or more utility service providers, government organizations, mobile phone service provider, and the like. In an example, the merchant device 108 related to an e-commerce website may be contacted upon authentication for providing missing details that are required for transaction. In some embodiments, the user may be required to authorize procuring information from the merchant device 108, at least initially. The user may authorize procuring information from his e-commerce related accounts, social media accounts, and the like and may not authorize procuring information directly from a bank account server. In some embodiments, the transaction facilitation device 106 or the merchant device 108 may act as a data aggregator that compiles user profiles with various attributes and personal information. Such information can be retrieved using one or more attributes as an index. For example, using the mobile phone number to pull the personal details of the user such as name, address, email, card information, and the like.

Once the user initially authenticates and authorizes procuring information from the merchant device 108, information stored in the transaction facilitation device 106 or one or more databases to which the transaction facilitation device 106 is connected may be configured to initiate transactions as discussed herein. In some embodiments, the merchant device 108 may relate to one or more social media accounts. In some embodiments, the merchant device 108 may relate to one or more telecom carrier provider accounts. Upon initial authorization, the personal details such as user's name, user's mobile phone number and the transaction details such as billing address, shipping address, and information related to the credit card using which the user usually transacts may be procured from the user, the merchant device 108, and/or the like. In an aspect, distinct second servers may be contacted for extracting different information. Once the required information is initially procured, the user device 102 may be presented with a prompt to confirm the information, thereafter no presentation of the procured information at the user device 102 for verification is needed. In some embodiments, the user may edit the initially procured information as the procured information may not be the latest information of the user. In some embodiments, the user may edit the procured information as the user may need to use a different payment method or a different account for payment. The information is presented to the user in such a manner that the procuring of information seems to be seamless to the user and reduces the time taken for a transaction thereby increasing the efficiency of the server executing the payment process.

According to an embodiment, the user device 102 may comprise of a memory, a processor and a program code stored in the memory, wherein the processor is configured for executing the program code. The program code may comprise an application such as a web application, web browser with a plug-in, or the like. Upon execution of the program code such as plug-in of a web browser, the apparatus may cause the apparatus to receive a payment request, determine whether the request is a request to pay a pre-authorized merchant, and, in an instance in which the request is a request to pay a pre-authorized merchant, automatically initiate payment processing or provide sufficient information to a payment processor to cause initiation of payment processing.

Figure 2:
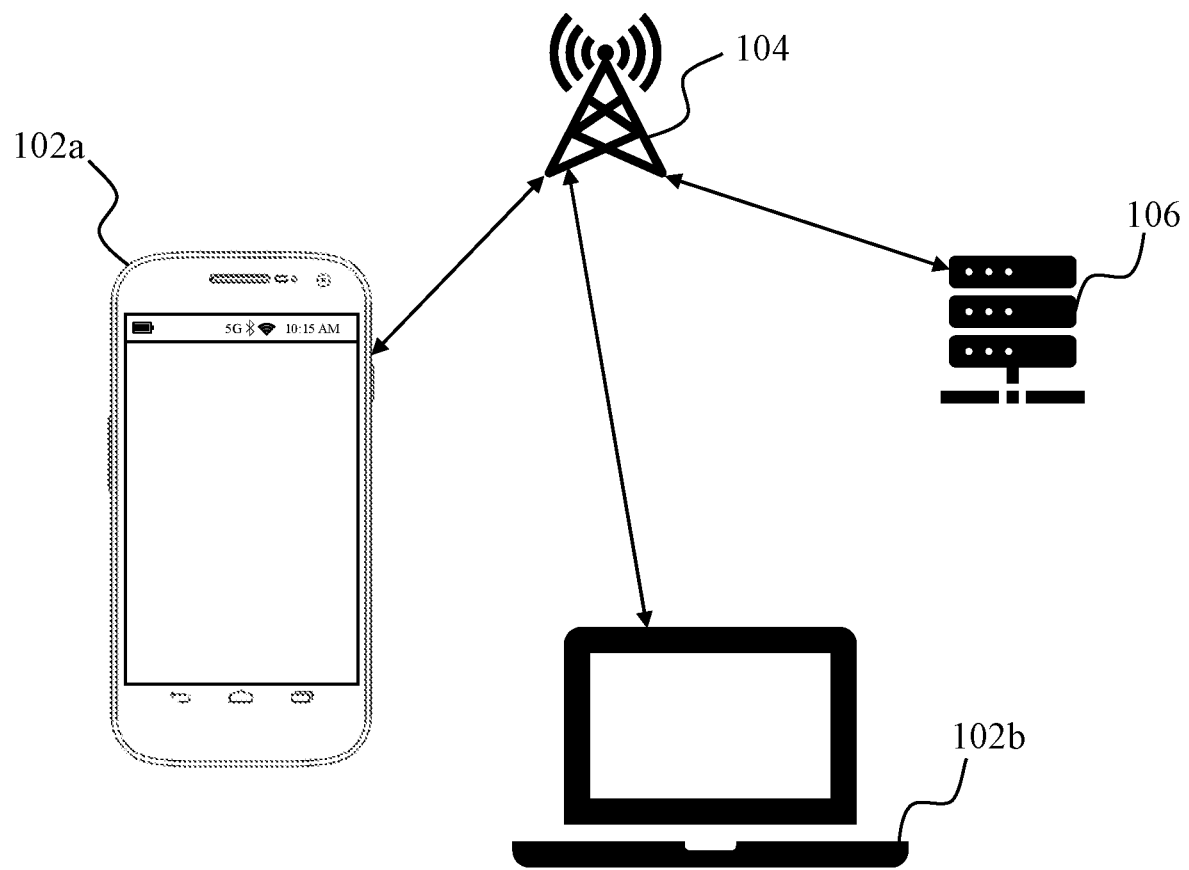
FIG. 2 illustrates a system for initiating secure purchases, payment processing, and financial transactions using a digital wallet, in accordance with various embodiments.

Referring now to FIG. 2, the system 100 is further illustrated, according to an embodiment. As illustrated, the system 100 can comprise a first user device 102a and a second user device 102b, both being in operable communication with a network 104, which may include a network node, core network, antenna, access network, or the like. The first user device 102a is illustrated as being a mobile telephone and the second user device 102b is illustrated as being a mobile computing device. However, the first and second user devices 102a, 102b, may comprise any suitable device for accessing the digital wallet and initiating a purchase, payment, or transaction. Other example examples of user devices may include smart wearable devices, tablets, desktop computers, cloud computing devices, servers, augmented reality computing devices, virtual reality computing devices, or the like. The first and second user devices 102a, 102b may be in communication, via the network 104, with the transaction facilitation device 106. The transaction facilitation device 106 may be connected to one or more databases (not depicted in the figure) for ascertaining the authenticity of authentication information provided either initially or subsequently by the user device 102a or 102b.

The program code stored in the memory of the user device 102 may include one or more modules such as an authentication module for directing the authentication server for authenticating the information received from the user, an authorization module for enabling the user to authorize one or more second servers to be queried, an information editor module for enabling the user to edit the information received from one or more servers, and a transaction module for sending information to the merchant server for processing the transaction.

In an alternate embodiment, the system 100 may enable the merchant device 108 for communicating with and directing the transaction facilitation device 106 to authenticate and the merchant 108 to extract information. According to such an embodiment, the merchant device 108 enables one or more authentication information to be sent from the user device 102 to the transaction facilitation device 106. Upon successful authentication, the merchant device 108 may be configured to receive the transaction and payment processing information from the transaction facilitation device 106. The merchant device 108 may then process the transaction. The merchant device 108 may be connected to one or more databases (not depicted in the figure) that may store user, user device, merchant, payment method and type, and/or transaction information for future use. In an aspect, the set of information may be stored under a user profile of the user within the digital wallet. The merchant device 108 may include a program code that may be executed by one or more processors of the merchant device 108. The program code may include one or more modules such as an authentication module for directing the authentication server for authenticating the information initially received from the user, an authorization module for enabling the user by means of the user device 102 to authorize one or more second servers to be queried, an information editor module for enabling the user by means of the user device 102 to edit the information received from one or more servers, and a transaction module for processing the transaction based on the information selected or added by the user.

Consolidated Digital Biller/Merchant and Payments Wallet

In some embodiments, the digital wallet may be a consolidated digital biller/merchant and payments wallet. Said otherwise, in some embodiments, the digital wallet may comprise i) information about one or more user accounts with one or more billers, utilities, vendors, and/or merchants, or the like, and may further comprise ii) information about one or more user payment options such as a user bank account, a user's credit card, a user's debit card, a user's pre-paid card, a user's cryptocurrency account, a digital cash application, a non-fungible token, a unique payment token, a user account with a third party payment processor, or the like.

In some embodiments, the digital wallet may be actively curated by billers, utilities, vendors and/or merchants, or the like (referred to herein collectively as "merchant"). In some embodiments, a merchant may provide information about the merchant and the user's account with the merchant to the digital wallet at the time of establishment of the digital wallet for the user. In some embodiments, a merchant may provide information about the merchant and the user's account with the merchant to the digital wallet after the time of establishment of the digital wallet for the user, at a time when the user or the merchant initiates a process for authentication of the merchant and the user's account with the digital wallet. In some embodiments, a merchant may provide information about the merchant and the user's account on an ongoing basis, an iterative basis, an as-needed basis, an ad hoc basis, upon request by the user, upon request by the digital wallet, as initiated by the merchant, and/or the like.

The information about the merchant and the user's account with the merchant may not be known by the merchant in all situations. As such, the merchant may initially provide a default set of information about the merchant and the user's account with the merchant, and then the digital wallet may request additional information needed by the digital wallet and/or the merchant may request confirmation about whether the digital wallet has sufficient information to perform transactions, using the digital wallet, between one of the user's payment options and the user's account with the merchant. For example, a merchant, such as a local natural gas utility, may initially provide an account number associated with the user's account at the merchant, a name of a financial institution with which the merchant has an account, an account number associated with the merchant's account at the financial institution, and a routing number for electronic transfer of funds into the merchant's account at the financial institution. In the event that the digital wallet identifies other information required for the digital wallet to complete transactions between a payment option stored in the digital wallet and the merchant's account at the financial institution, the digital wallet may request, from the merchant and/or the financial institution with which the merchant has an account, said other information.

Likewise, the user may initiate an authentication process for a payment option, such as the user's credit card, in the digital wallet or otherwise, and may provide an initial set of information about the credit card to the digital wallet, such as one or more of: a credit card company name, a credit card number, an expiration date of the credit card, an account-holder name as printed on the credit card, a security code (e.g., CVV) printed on the credit card, a billing address associated with the credit card, and/or the like. In an instance in which the digital wallet determines that some of the above initial set of information and/or other information is needed for processing transactions between the payment option and a merchant, the digital wallet can request the additional information directly from the credit card information based upon the information provided by the user. In some embodiments, the initial set of information about the credit card associated with the user can be provided by the credit card company instead of the user, such as in response to the user requesting that the digital wallet add the credit card to the digital wallet as a payment option. In some embodiments, upon receiving such a request for adding a payment option at the digital wallet, the digital wallet can initiate a third party authentication process or an authentication process carried out by the credit card company, which may request authentication information, such as a username and password for a credit card company account affiliated with the user, after which the credit card company may provide all other information needed by the digital wallet.

After receiving the information from the merchant or payment option, the digital wallet may store the information in the digital wallet permanently, for a pre-determined period of time, until an expiration date of the payment option, or otherwise. In some embodiments, the digital wallet may accept manual or other input of information about the user, a user account, a merchant, a payment option, or the like from the user via a user device, for example. In some embodiments, the user may access the digital wallet via a web portal, an application, a browser, an application programming interface, a third party user interface, a merchant website, a merchant application, a payment option website, a payment option application, or the like. The digital wallet can be hosted on, reside on, be stored on, be accessed via, or otherwise engage with a user device.. The digital wallet can be accessed by a user to facilitate completing a transaction, such as between a payment option for which the user has information stored in the digital wallet and a user's account with a particular merchant for which the user has information stored in the digital wallet. In some embodiments, the digital wallet may be consolidated, while in other embodiments the digital wallet may be at least partially distributed, such as through bifurcation of information in the digital wallet. In some embodiments, the digital wallet may be at least partially fragmented and/or portable, such as through discrete storage of a part of the digital wallet or a copy of the digital wallet in a memory or storage device. In some embodiments, the digital wallet may comprise one or more editable portions and one or more non-editable portions that are created especially for a particular merchant or payment option, and which, if the user, merchant, or payment option entity deauthorizes or removes the user's account with the merchant or the payment option from the digital wallet, a respective non-editable portion of the digital wallet is simply decoupled or disassociated from the digital wallet without affecting the other one or more non-editable portions and the one or more editable portions. In some embodiments, non-editable portions of the digital wallet may be able to be queried by merchants, payment option entities, the user, and/or the like, while remaining protected against unwanted hacking or the like.

In some embodiments, the information stored in the digital wallet may be provided by unauthenticated, single direction upload of documents, bills, payment option statement, or the like. For example, the user may take a digital picture of a physical bill that they receive in the mail, which may have been received, for instance, from a local natural gas utility with which the user has an account. The user may upload this digital picture of the physical bill, e.g., via smartphone, laptop, or the like, to the digital wallet directly or via any suitable portal, application, browser, or other means for accessing the digital wallet. In some embodiments, the digital wallet may save a digital copy of the physical bill or conduct optical character recognition, or the like, to determine the various fields of the physical bill and the content in each of the various fields. In some embodiments, the digital wallet may comprise or be in communication with one or more databases, such as a payment option information database, a merchant account information database, a user information database, a combined payment option and merchant account information database, a combined user, payment option, and merchant account information database, or the like (collectively "databases"). In some embodiments, the digital wallet may store optical character recognition data from the physical bill into one or more databases, or may review information about the local natural gas utility (merchant) and the user's account with this merchant in the one or more databases linked to the digital wallet and determine whether the information provided on the physical bill matches that stored in the one or more databases, check for additional fields or data that are presented on the physical bill but which are not stored in the databases, and/or the like. The digital wallet may update the merchant information and/or user account information for that merchant in the one or more databases accordingly.

In some embodiments, the user may upload a digital picture of a physical bill just the first time a physical bill is received from the merchant, which the digital wallet can interpret as a request to establish that merchant as an authorized merchant in the digital wallet. By simply uploading the physical bill to the digital wallet, the user initiates the authentication process by the digital wallet program, which may carry out some or all of that process without further user input or authentication. In some embodiments, the user may trigger the authentication of a payment option in the digital wallet by accessing a merchant site and attempting to carry out a transaction using that payment option by selecting that payment option from a menu of available options, for example. When the user is asked to directly provide authentication indicia, such as a username and/or password, the digital wallet or a widget, add-on, application, or the like that is operable to be initiated when the user devices receives a request to provide such authentication indicia, may intervene directly with the user, directly with the payment option entity, and/or provides a splash page or pop-up that asks the user to sign in to their pre-existing account with the payment option entity or to create a new account with the payment option entity. Once the user enters their authentication indicia to sign into the payment option, or once they create an account with the payment option entity and subsequently sign in via the splash page or pop-up, the digital wallet stores that log-in information or other such authentication indicia associated with the user's payment option entity account. The digital wallet can then query a payment option entity server or the like for additional relevant information regarding the user's payment option entity account. For instance, when the user signs into their account with the payment option entity, for example a credit card company with which the user holds an account, the digital wallet may store the username and password associated with that payment option entity account, but the digital wallet may need additional information not initially provided, such as the credit card number, expiration date, security code/CVV, and/or the like. The digital wallet may be configured to carry out a query of the payment option entity server or the like to retrieve that missing information, or may engage with a chatbot or the like to request that information. Because the digital wallet stores user information and information about the user's accounts with merchants, the digital wallet can directly engage with merchants, payment option entities, or the like, and navigate further authentication steps, where required, by providing the necessary information about the user or the user's account with a merchant or payment option entity to advance the authentication process. In some embodiments, the further querying and authentication processes may occur in the background and/or otherwise without requiring further input by the user.

In some embodiments, other documents besides physical bills may be photographed, scanned, digitized, or otherwise provided to the digital wallet. For instance, a user may want to upload a copy of their driver's license, passport, birth certificate, or other personally identifying documents to the digital wallet. In some embodiments, when the user uploads such document to the digital wallet, they may indicate that the documents are sensitive or are to remain private, or the digital wallet, when scraping each document for information, may determine based upon the content and the context of the document provided, whether the information provided and/or the digital document itself needs to be privacy protected or the like. In some embodiments, the digital wallet may store different parts of the document and/or different parts of the information scraped from the document in different locations, such as in discrete portions of the digital wallet, in an encrypted or otherwise secure subportion of the digital wallet, and/or the like. The digital wallet may also or alternatively hash, encrypt, privacy protect, or otherwise protect the digital image of the document and/or the data itself and then store that protected digital image and/or information about the digital document in a centralizes database, server, cloud computing environment, and/or locally on the user's device(s) as a cache associated with the digital wallet. Such storage of the user's personally identifying documents in the digital wallet may provide multiple benefits, such as that the user can access from anywhere a copy of these important documents, the digital wallet can provide information from these documents or the documents themselves when necessary for establishing/authenticating a connection between the digital wallet and payment options/merchants, and can act as a digital repository for documents that may be presented now or in the future in digital-only format. An example might be that the user uploads a picture of the main photo page and biographical information page of their passport to the digital wallet—the digital wallet scrapes that image for information that it stores in the database to assist with facilitating further transactions, and/or the like, and generates an authentication token or digital version of the users passport, for the user to quickly access and present via their smartphone or the like, when boarding an airplane or when they are otherwise required to present it. In some embodiments, the digital wallet can generate a unique digital passport or unique token recognizable by a laser or optical scanner and processor system, e.g., at the Travel Security Administration (TSA) before taking a flight. The unique token can be generated in accordance with a format standardized across the industry, by TSA, by another agency or the like. The unique token may be received upon request by the digital wallet from a governmental agency network/system for automatically generating such tokens, in which case the digital wallet can carry out such a request process in the background without requiring the user to participate.

According to another example, after the user purchases a new car, the user will likely need to add the new car to their car insurance plan, and perhaps remove the old car if it is being traded in. In some embodiments, the user can take a photograph of the bill of sale, title, registration card, the car's vehicle identification number (VIN), and/or the like, and upload those images to the digital wallet. The user may already have associated their car insurance plan for one or more other vehicles with the digital wallet. When the digital wallet determines that the user has purchased a vehicle and needs to add that vehicle to their car insurance plan, the digital wallet may initiate an automated process, e.g., with a chatbot hosted by the car insurance company, to add the vehicle to the user's car insurance plan, provide all necessary information to the car insurance company in order for the car insurance company to be able to add the car to the car insurance plan, and may then receive and store the new vehicle insurance card/card information in the digital wallet for ease of access by the user. Then, should the user get pulled over, the user can access their car insurance plan information, proof of insurance card, and/or the like by simply accessing their digital wallet (e.g., from the application in their smartphone), to provide proof of insurance to the officer upon request. Likewise, if the user has a car accident, the user can access their car insurance information in the digital wallet, and can provide that information to the other driver(s) when necessary.

In some embodiments, after the merchant creates a new account associated with a user, the merchant may provide the user with a link, e.g., via SMS text, email, phone call, and/or the like, to the digital wallet program/application such that, if the user does not yet have a digital wallet, the user can create a digital wallet for themselves and the initiating merchant's information will already be pre-loaded into the digital wallet, including the user's account information with that merchant. In an instance in which the user already has a digital wallet, instead of generating a new digital wallet when a merchant sends the user such a link to initiate a digital wallet, the information provided in the merchant's digital wallet link/recommendation may be synchronized with that information for the same merchant that is already stored in the user's digital wallet.

In some embodiments, if the user already has a digital wallet and, e.g., they have already stored plural preferred payment options in the digital wallet, the user may provide their digital wallet identification number to the merchant at the time that the user establishes an account with that merchant such that the merchant can actively provide relevant merchant and user account information into the digital wallet and query the digital wallet for any additional information needed to assist with finalizing account set-up for the user.

In some embodiments, the digital wallet may be able to synchronizer certain information across some or all merchants and payment options. For example, when a user changes banks, the new bank may query the digital wallet to initiate the change of bank account/bank information with any merchants and payment option entities associated with the user's digital wallet. For example, the digital wallet may be configured to generate a form email to all merchants notifying them of such a change. Other changes might include a change of address, a name change, notifications by a family member of merchants and/or payment option entities that the user is deceased, etc.

In some embodiments, communication between the user and a merchant, for example, may be initiated via the digital wallet since the digital wallet can store information about the merchant such as the direct route for interaction with the merchant's chatbot, the telephone number at which the user can reach the merchant, etc. One example would be that the user, when they purchase a new washer and dryer from a hardware store, can upload digital images of the bill of sale and warranty information to their digital wallet. Then, down the road a few years, if the washer or dryer stopes working or seems to need maintenance, the user can access their warranty and bill of sale directly in the digital wallet, can initiate a telephone call with the hardware store via the digital wallet, for example, and/or can complete an automated request for service by sending a message to the hardware store and providing the bill of sale/warranty information, if necessary.

In some embodiments, the user may provide information/ photographs of such documents via email, text message, direct upload, and/or the like. This Wallet will have a Bill and bill payment specific email attached where the user can provide this email to all billers or Paymentus wallet will automatically inform the biller to receive all payments and billing related notifications.

In some embodiments, the digital wallet may be in operable communication with an email application where the user receivers their email, and may be configured to intercept all electronic bill payment notifications, electronic bill payment reminders, electronic bill payment confirmation emails, and/or the like. In some embodiments, the digital wallet can organize such notifications and emails, and can calendar automatic bill payment, payment reminders, investment contributions, and the like, either in the background without requiring participation by the user, or in an associated/available calendar associated with the user's email. For example, the digital wallet may organize emails/ notifications across some or all merchants and/or payment option entities according to one or more categories, such as: bills, payment reminders, payment confirmation, notification of account or user information change, service/repair appointments, expiring payment cards, etc.

In some embodiments, the digital wallet may comprise a merchants/billers section, a payment solution entity space, a documents/information database query interface, and/or the like. In some embodiments, information associated with past bill pay, scheduled bill pay, expected bill pay, and/or the like may be easily queried by the user by searching for example for "Duke Power" in a search bar located within the merchants/billers section of the digital wallet, for example. Such a search of the digital wallet by merchant name, for example, will return information about the merchant, past payment events associated with the merchant, communication between the user and merchant, and/or the like.

In some embodiments, the digital wallet pay use artificial intelligence, machine learning, and/or the like to read all relevant notifications and emails, schedule recurring or an ad hoc bill payment events according to one or more default preferences or one or more user preferences.

In some embodiments, a unique email address, a unique universal records locator (URL), or the like may be generated for each digital wallet such that the digital wallet may relay through, or forward to the unique email address, all merchant and/or payment option entity correspondence. As such, instead of providing their local natural gas utility with their own email address, the user can provide the unique email address associated with the digital wallet, which the user may also access directly via the digital wallet or otherwise, and the digital wallet program can directly interpret, categorize, and process incoming correspondence from merchants and/or payment option entities.

In some embodiments, the digital wallet may be configured to store and/or generate one or more digital currencies. For example, the digital wallet may generate or store a user account-affiliated digital currency which may have a value at least partially independent of the value of other currencies, or the value of the user account-affiliate digital currency may track with the value of an existing currency, for example the U.S. Dollar. In some embodiments, the user account-affiliated digital currency may be similar to other blockchain-enabled crypto currencies or payment options that relies upon a distributed ledger for authentication and valuation. In some embodiments, the user account-affiliated digital currency may be freely usable without requiring any additional time for authentication or the like, but requires synchronous authentication by the digital wallet to be used in a financial transaction, such that the digital wallet can manage the listing of pre-authenticated merchants in near real-time and only authorize the use of the unique, user account-affiliated digital currency for transactions only with authorized merchants.

In some embodiments, some or all of the digital wallet may be associated with a physical chip card that is configured to be used only for transactions with pre-authorized merchants. In some embodiments, since the physical card can only be used to initiate transactions between a pre-authorized payment solution and a pre-authorized merchant, if the physical card is stolen or lost, the worst that can happen is that an unauthorized person transfers money between a user-affiliated payment option/account and a user-affiliated merchant.

In some embodiments, a new digital currency is provided for making payments, which may be called BillCoin, PayCoin, OmniCoin, ConsoliCoin, UniCoin, MonoCoin, OneCoin, SelectCoin, CentralCoin, ClusterCoin, CombiCoin, BillToken, PayToken, OmniToken, ConsoliToken, UniToken, MonoToken, OneToken, SelecToken, CentralToken, ClusterToken, CombiToken, and/or the like (collectively "BillCoin"). In some embodiments, the new digital currency can take a digital form, can be issued or generated by a centralized developer, sold or exchanged among users, resold to the developer, used and accepted by certain merchants, exchanged for one or more other currencies (digital or otherwise), stored on any form of memory device, inspected and/or added to by a processor, transferred between one or more user devices, integrity protected, encrypted, cryptographically secured, and/or the like.

In some embodiments, BillCoin, can be purchased from an electronic exchange, market, shop, storefront, retail store, interface, vendor, or the like. In some embodiments, BillCoin can take an electronic form and can include one or more electronic files comprising bits that store information about the type of currency, amount of currency, generation and sales or transfer history, and/or the like. In some embodiments, BillCoin can be configured to only be used for transactions with merchants authenticated in the digital wallet, or sometimes only a portion of merchants authenticated in the digital wallet. In cases where a user wants to transact BillCoin with a merchant and the merchant does not receive payments in BillCoin, Paymentus or a third-party can receive the BillCoin from the user, exchange the BillCoin for an accepted currency or form, and transfer payment to merchant in the accepted currency or form. One form of currency may be exchanged within the digital wallet with another form of currency, such that a user can elect to pay with a particular currency and, in an instance in which the merchant does not accept that particular currency, the digital wallet can automatically convert the particular currency to another currency that is accepted by the merchant or convert the particular currency to another currency that is accepted by the merchant upon request to do so by the user.

In some embodiments, each unit of, or discrete, BillCoin may be assigned a unique identification code and be tracked in a ledger, such as a distributed ledger. In some embodiments, a Wallet ID associated with the user's digital wallet account may be associated with the unique identification code of the BillCoin.

In some embodiments, the BillCoin may comprise one or more application files, one or more data files, one or more coin files, one or more token files, or the like (collectively "BillCoin file"). In some embodiments, the BillCoin file can have a file structure for storing information about the BillCoin. For example, the file structure may include a header containing header information such as the unique identification code. In some embodiments, the file structure can comprise one or more payloads such as a number (integer and/or fraction) of BillCoin stored in the BillCoin file, a blockchain ledger, a distributed ledger (public or private), and/or the like. In some embodiments, a pre-set and static number of BillCoin may be developed, mined, coded, generated, or otherwise created initially with no addition of BillCoin to the total BillCoin marketplace after that time. In some embodiments, one or more BillCoin may be created initially and then one or more other BillCoin can be developed, mined, coded, generated, or otherwise created at one or more later dates (whether on fixed dates, dynamically determined dates, within pre-determined windows of time, and/or the like).

In some embodiments, the BillCoin file may comprise a ledger having a data structure of blocks, the ledger being a file which is public, updated continuously, and synchronized across all BillCoin files at some pre-determined frequency. In some embodiments, the first transaction event of a BillCoin that is written into the ledger is the a genesis block or "$0^{th}$" block. The genesis block may permanently indicate the date and time of creation of the BillCoin. The ledger may, upon subsequent exchange, sale, transaction, or transfer between users, be amended to include a subsequent block or "$n^{th}$" block that is immediately downstream and flows from the genesis block. Each block may include a hash of the previous block or all prior blocks up the chain to the genesis block. In some embodiments, such as when the BillCoin can be fractionalized, a plurality of blocks (two or more) can flow from each block of the blockchain and the hash of prior blocks may include even blocks that are not up the chain but on parallel legs of the chain. In some embodiments, the hash of prior blocks in an instant block (any particular block) may be more like an imaging or mapping of the entire blockchain structure at the point of generation of the instant block. In some embodiments, the instant block of the blockchain may comprise a hash of the immediately upstream or previous block and separately a transaction root sequence or mapping of the entire blockchain at the time of generation of the instant block. In some embodiments, the instant block may comprise a timestamp (date and time) and/or a location stamp (IP address, physical location, IMAP/MAP, a unique name of generating entity, unique name of initial exchange or storefront at time of generation or initial transaction, or the like). In some embodiments, the In some embodiments, the ledger in an instant BillCoin file (any particular BillCoin file) may be updated each time any transaction of any BillCoin, plurality of BillCoin, or fraction of a BillCoin occurs. In some embodiments, the ledger may be updated only for BillCoin files that are involved in a transaction. In some embodiments, a centralized ledger may be kept instead of, or in addition to, the decentralized ledger of transactions.

In some embodiments, BillCoin files may store a Digital Wallet identification (number, username, user's legal name, BillCoin exchange username, etc.) associated with the current owner and/or any past owners of the BillCoin or fractional BillCoin. In some embodiments, BillCoins and/or fractional BillCoins can be combined by merging the respective BillCoin files into a single BillCoin file. In some embodiments, a part of a BillCoin or a part of a fractional BillCoin can be spent, sold, or transferred from a user to another user or a merchant, for example, while the user retains another part of the BillCoin or another part of the fractional BillCoin—in which case two new BillCoin files can be generated from the original BillCoin file associated with the BillCoin or fractional BillCoin prior to said transaction of a part of the BillCoin or fractional BillCoin.

In some embodiments, a BillCoin file may include a program or coding that allows the BillCoin to only be stored in the digital wallet. In some embodiments, the BillCoin file may include a program or coding that allows the BillCoin to only be stored in the digital wallet of the user currently registered in the BillCoin file as owning the BillCoin. In some embodiments, the BillCoin file may include a program or coding that allows the BillCoin to only be transferred between digital wallets (e.g., Paymentus digital wallets), and/or between a digital wallet storing the BillCoin and merchants being stored as pre-authorized merchants in the digital wallet storing the BillCoin, payment entities being stored as pre-authorized payment entities in the digital wallet, a BillCoin exchange or storefront (e.g., Paymentus' BillCoin Exchange) and/or a pre-authorized third party.

In some embodiments, a user of the digital wallet may be a person that registers for the digital wallet. In some embodiments, the user must provide certain information at time of registering a new digital wallet, such as their legal name, their mailing address, their billing address, their social security number or other such identifier (driver's license number, passport number, identification card number, etc.), and/or the like. In some embodiments, the digital wallet may thereafter be accessed by the user by way of a user device, such as a smartphone, a laptop, a tablet, a desktop, a smart television, a user internet-of-things (IoT) device, a smart speaker, a smart assistant, a pre-authorized merchant's point of sale (POS) interface, a payment entity's POS interface, a POS interface of a BillCoin exchange and/or an authorized third party, a web site of a pre-authorized merchant, a web site of a pre-authorized payment entity, a web site of the BillCoin exchange, a web site of a pre-authorized third party, and/or the like.

In some embodiments, to initiate a transaction, the user may indicate a merchant or user account with a merchant to which the user would like to transfer a payment, and the amount being paid/transferred, and the digital wallet can complete the rest of the transaction based on the information stored in the database(s). In some embodiments, the user can associated a smart device, such as a smart phone, virtual assistant, voice assistant, and/or the like, to have temporary or persistent access to the digital wallet such that the user can give textual or vocal comments such as "pay $100 from my default bank account to Duke Power for my electric bill this month" and the digital wallet can interpret from that textual or verbal request, who the biller is, what the amount is, and what payment option the user is requesting, if any. In some embodiments, the digital wallet may store merchant preferences such as which payment option or options is(are) preferred by each merchant, any payment options that are strictly disallowed by a merchant (e.g., if any do not accept a cryptocurrency or the like, for example, etc. In some embodiments, if the digital wallet cannot initiate the transaction between the payment option entity and the merchant either based on a lack of information or a technical issue, the digital wallet may initiate a call to an interactive voice response system or a call center operated by the merchant to proceed with carrying out the transaction based on the user's initial request. Some or all of these steps may be carried out without requiring active participation by the user. In some embodiments, if the digital wallet or virtual assistant require user participation based on particular circumstances of a transaction, the digital wallet may alert the user that the user is needed to participate in a phone call with a call center operator in a call center operated by the merchant, such as by conferencing in the user on their mobile phone, forwarding the call to their mobile phone, dropping into the user's smart speaker, and/or the like.

In some embodiments, the digital wallet can be configured for recurring payments, as a default payment option, and/or the like. In some embodiments, the digital wallet may use machine learning or the like to assist with or facilitate transactions. In some embodiments, the digital wallet may be accessed by a user by way of their smart speaker or other such device, and the user may simply ask that a certain bill be paid with respect to a certain pre-authorized merchant or that another such transaction takes plate. For example, if a user asks their smart speaker to "please pay my current electricity bill," the smart speaker, which is already associated with and has access to the digital wallet, may format and send such a request to the digital wallet in any number of forms or formats suitable for communicating the request to the digital wallet, and the digital wallet, which already is associated with the user's pre-authorized electricity provider and with one or more pre-authorized payment entities, may select the correct pre-authorized payment entity based upon previous similar transactions or user/merchant preferences, and initiate transfer of the correct amount (known from the latest bill stored from the user's pre-authorized electricity provider, a digital copy of which may be stored in the digital wallet or accessed by the digital wallet) to the user's pre-authorized electricity provider in a correct form and format, indicated, earmarked, or otherwise denoted for payment of the user's latest electricity bill.

Figure 3:
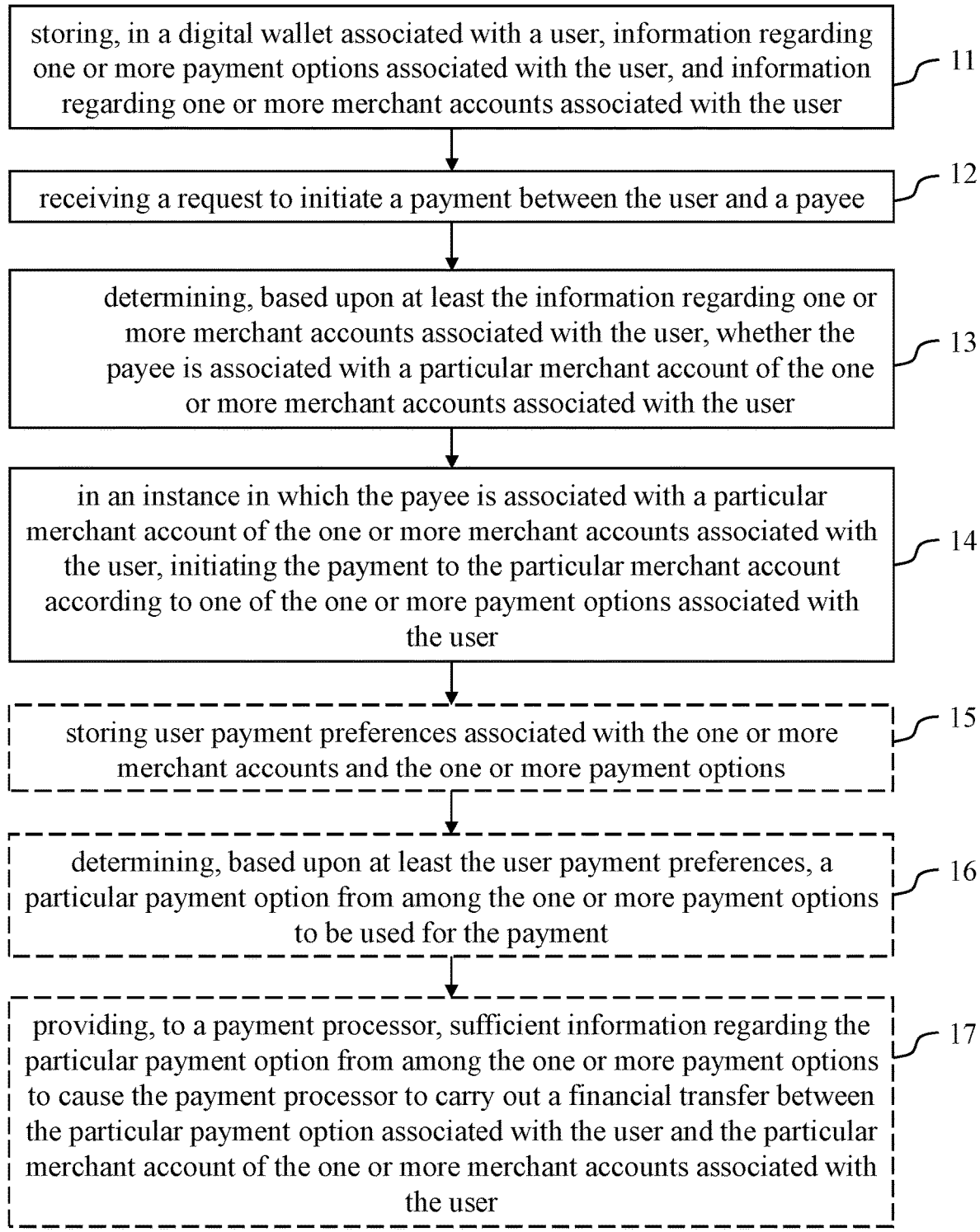
FIG. 3 depicts a flowchart illustrating a method for secure payment processing using a user account-affiliated digital wallet, in accordance with an embodiment.

Referring now to FIG. 3, a flowchart illustrates a method 10 for accessing a digital wallet in accordance with an embodiment. At 11, the method can comprise storing, in a digital wallet associated with a user, information regarding one or more payment options associated with the user, and information regarding one or more merchant accounts associated with the user. At 12, the method can further comprise receiving a request to initiate a payment between the user and a payee. At 13, the method can further comprise determining, based upon at least the information regarding one or more merchant accounts associated with the user, whether the payee is associated with a particular merchant account of the one or more merchant accounts associated with the user. At 14, the method can further comprise in an instance in which the payee is associated with a particular merchant account of the one or more merchant accounts associated with the user, initiating the payment to the particular merchant account according to one of the one or more payment options associated with the user. At 15, the method can, optionally, further comprise storing user payment preferences associated with the one or more merchant accounts and the one or more payment options. At 16, the method can, optionally, further comprise determining, based upon at least the user payment preferences, a particular payment option from among the one or more payment options to be used for the payment. At 17, the method can, optionally, further comprise providing, to a payment processor, sufficient information regarding the particular payment option from among the one or more payment options to cause the payment processor to carry out a financial transfer between the particular payment option associated with the user and the particular merchant account of the one or more merchant accounts associated with the user.

Figure 4:
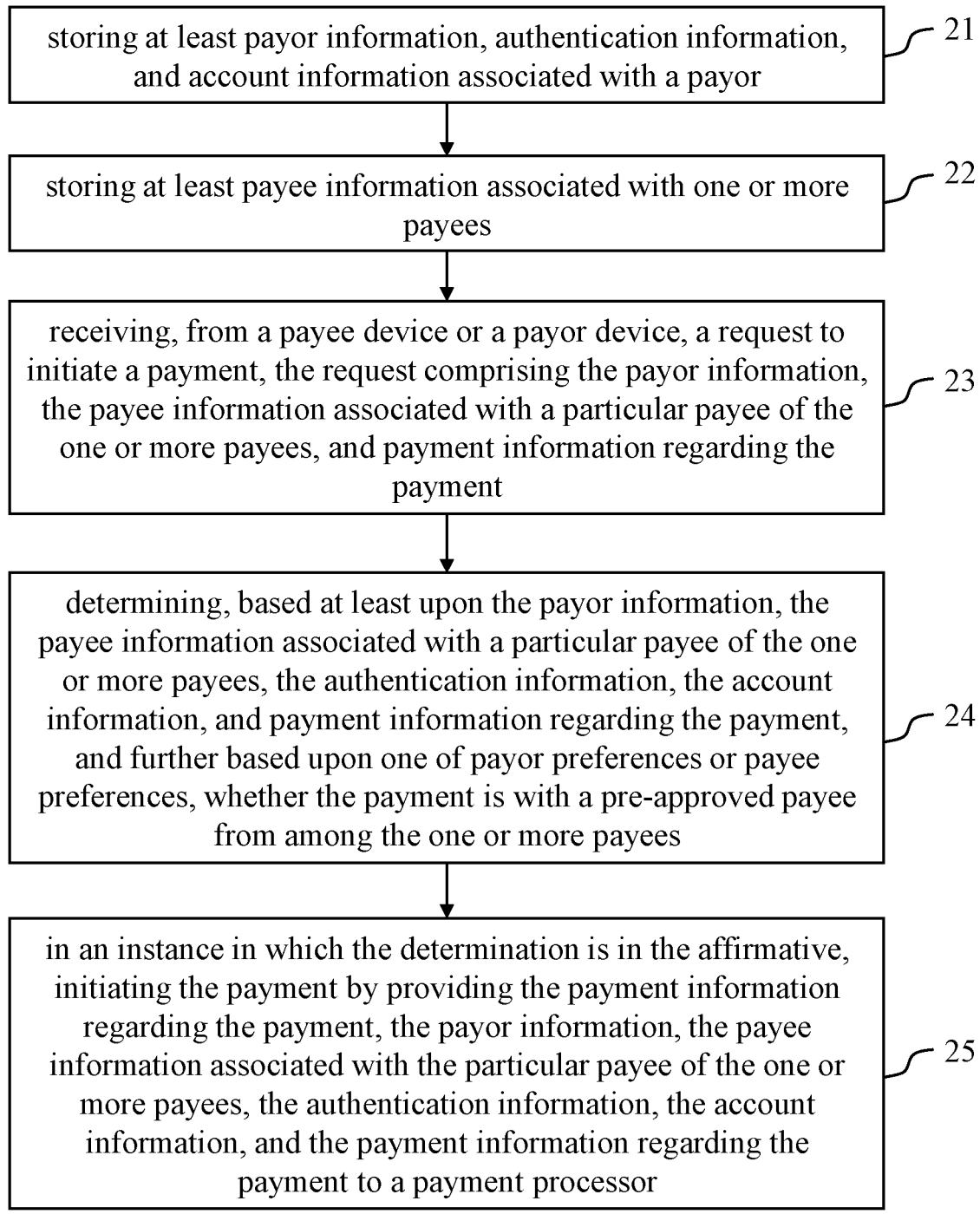
FIG. 4 depicts a flowchart illustrating a method for secure payment processing using a user account-affiliated digital wallet, in accordance with an embodiment.

Referring now to FIG. 4, a flowchart illustrates a method 20 for accessing a digital wallet in accordance with an embodiment. At 21, the method can comprise storing at least payor information, authentication information, and account information associated with a payor. At 22, the method can further comprise storing at least payee information associated with one or more payees. At 23, the method can comprise receiving, from a payee device or a payor device, a request to initiate a payment, the request comprising the payor information, the payee information associated with a particular payee of the one or more payees, and payment information regarding the payment. At 24, the method can further comprise determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees. At 25, the method can further comprise in an instance in which the determination is in the affirmative, initiating the payment by providing the payment information regarding the payment, the payor information, the payee information associated with the particular payee of the one or more payees, the authentication information, the account information, and the payment information regarding the payment to a payment processor.

Figure 5:
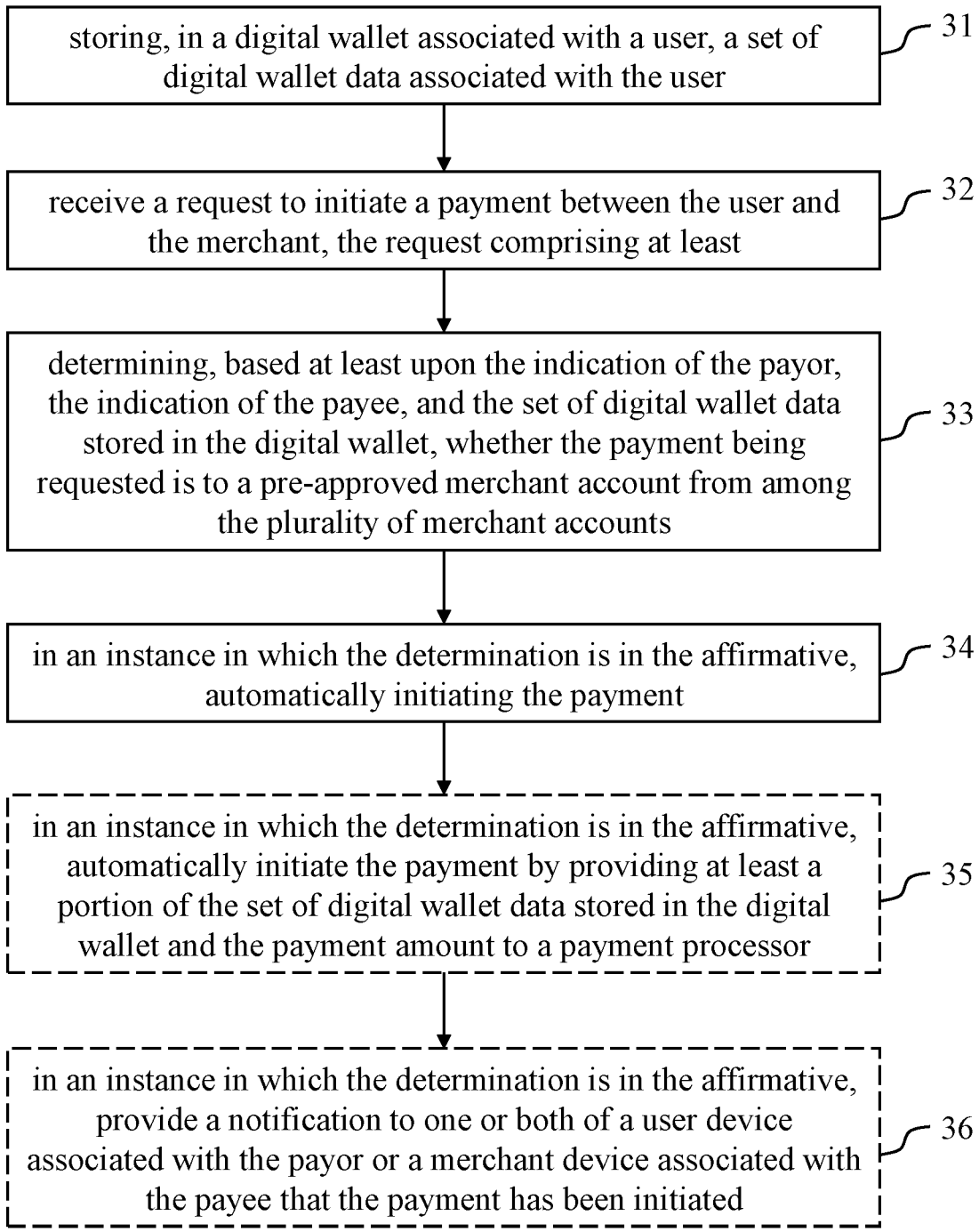
FIG. 5 depicts a flowchart illustrating a method for secure payment processing using a user account-affiliated digital wallet, in accordance with an embodiment.

Referring now to FIG. 5, a flowchart illustrates a method 30 for accessing a digital wallet in accordance with an embodiment. At 31, the method can comprise storing, in a digital wallet associated with a user, a set of digital wallet data associated with the user. At 32, the method can comprise receive a request to initiate a payment between the user and the merchant, the request comprising at least. At 33, the method can comprise determining, based at least upon the indication of the payor, the indication of the payee, and the set of digital wallet data stored in the digital wallet, whether the payment being requested is to a pre-approved merchant account from among the plurality of merchant accounts. At 34, the method can comprise in an instance in which the determination is in the affirmative, automatically initiating the payment. At 35, the method can, optionally, comprise in an instance in which the determination is in the affirmative, automatically initiate the payment by providing at least a portion of the set of digital wallet data stored in the digital wallet and the payment amount to a payment processor. At 36, the method can, optionally, comprise in an instance in which the determination is in the affirmative, provide a notification to one or both of a user device associated with the payor or a merchant device associated with the payee that the payment has been initiated.

Described herein are systems, apparatuses, methods, and computer program products for simple and secure initiation of payments and financial transactions.

According to some embodiments, a user account-affiliated digital wallet system is provided, the system comprising a user device, a merchant device, and means for initiating a payment or other such transaction, such as a transaction initiation device. The transaction initiation device may comprise a processor and memory device storing program code. In some embodiments, the memory device and the program code are configured, with the processor, to cause the transaction initiation device to store at least user account information in a digital wallet. Other information, such as a user's account information for one or more merchants, authentication indicia, personally identifying information, payment option details, credit and/or debit card details, bank account information, user payment preferences or requirements, merchant payment preferences or requirements, and/or the like may also be stored in the digital wallet. In some embodiments, the transaction initiation device may store the digital wallet locally or remotely, in a singular location or in plural locations. For instance, the digital wallet may store some information in an encrypted format while storing other information in a non-encrypted format.

According to some embodiments, the transaction initiation device may receive a purchase request, from the user device, another device associated permanently or temporarily with the user, the merchant device, another device associated permanently or temporarily with a merchant, an unknown device, or the like. The purchase request can be as simple as including an indication of a payor, an indication of a payee, and a payment amount. The purchase request may alternatively include other information, such as personally identifying information (PII) associated with the user, a request for authentication indicia from the user, contextual information about the reason or cause for the payment, or the like. In some embodiments, the purchase request may provide an identifying value such as a merchant-side account number in lieu of a payor name or other PII. In such an instance, the transaction initiation device may query a set of digital wallets or otherwise reference a set of information about plural users to associate the provided identifying value with a particular user. In some embodiments, the payment request may include a merchant/payee account information in lieu of a merchant name or other merchant information necessary to carry out the payment or transaction. In such an instance, the transaction initiation device may query the set of digital wallets or a separate merchant dataset to associate the provided merchant/payee account information with the merchant name or other merchant information necessary to carry out the payment or transaction. In some embodiments, user payment preferences or user payment requirements may be stored in the digital wallet or referenceable by the transaction initiation device during initiation of the payment or transaction.

According to some embodiments, the digital wallet may be configured to only participate in payment or transaction processing for payment to merchants with which the user/payor has an account, and only for payments/transactions associated with said account. In some embodiments, the digital wallet may be configured to only participate in financial transactions when the financial transactions are designated for payment of an outstanding bill associated with a user account with the payee. In some embodiments, the transaction initiation device may be configured to, upon receiving a payment or transaction request, determine if the payee or merchant indicated in or associated with the payment or transaction request is a merchant or payee with which the user/payor has an account.

In some embodiments, even if a purchase request, bill payment request, financial transaction request, or the like, originates from an unknown entity, the transaction initiation device and/or digital wallet may be configured to still initiate and/or carry out the purchase, bill payment, financial transaction, or the like. For example, the transaction initiation device and/or digital wallet may determine, from the purchase request, bill payment request, financial transaction request, or the like, the identity of the user associated with the digital wallet, the merchant/payee to which the money or other currency for the purchase, bill payment, financial transaction, or the like are directed, and the amount of money or other currency being requested. Once the transaction initiation device and/or digital wallet determines the identity of the user/payor and the identity of the merchant/payee, the transaction initiation device and/or digital wallet can reference a database or set of pre-authorized merchant accounts associated with the user and determine if the merchant/payee identified in the request is associated with one of the pre-authorized merchant accounts. In an instance in which the transaction initiation device and/or digital wallet determines that the merchant/payee identified in the request is associated with a pre-authorized merchant account, the transaction initiation device and/or digital wallet can automatically initiate the transaction or automatically provide all necessary transaction details to a payment processor to cause the payment processor to carry out the purchase, bill payment, financial transaction, or the like.

In other embodiments, the transaction initiation device and/or digital wallet may be configured to receive, store, retrieve, or otherwise determine user payment preferences, user payment requirements, user payment type requirements, or the like. In other embodiments, the transaction initiation device and/or digital wallet may be configured to receive, store, retrieve, or otherwise determine, for one, some, or all merchants, merchant payment preferences, merchant payment requirements, merchant payment type requirements, or the like. In some embodiments, the user payment preferences may include a particular type of payment method or a particular payment method preferred for use with one, some, or all merchants. In some embodiments, the merchant payment preferences may include a particular type of payment method or a particular payment method preferred by one, some, or all merchants. In some embodiments, the In another embodiment, a user account-affiliated payment card is provided. The payment card can have dimensions substantially similar to that of a conventional credit card or debit card. In some embodiments, the payment card can comprise one or more of: a card number, a cardholder name, an expiry date, a security chip, a Europay, MasterCard® and Visa® (EMV®) chip, a magnetic strip, a CVV number, a dynamic CVV number, a near field communication (NFC) transmitter, inductive coupling antennas, and/or the like. The payment card can store information regarding one or more merchant accounts associated with one or more merchants. The payment card is configured to initiate payment with a merchant associated with the one or more merchant accounts. For example, a user may associate their payment card with one or more merchant accounts and provide at least one payment method to be stored on the payment card. A payment method can include another payment card, such as a credit card or a debit card, a bank account, an e-payment account such as a PayPal® account, a cryptocurrency, an electronic currency, a token having value, cash, e-wallet funds, non-fungible tokens, a stored-value card, electronic bank transfers, ApplePay®, GooglePay®, AndroidPay®, or the like. In some embodiments, at least a portion of the digital wallet can be or comprise a pass-through digital wallet or a stored-value digital wallet. In some embodiments, a portion of the information stored on the payment card (e.g., on an embedded chip or the like) can be encrypted while other portion(s) of the information stored on the payment card can be non-encrypted.

By way of example only, a user may use a payment card, such as described herein, to purchase a product or service, pay a bill or invoice, initiate a financial transaction, or the like. However, according to some embodiments, the payment card can be user account-affiliated such that it is only configured for initiating payments, purchases, or financial transactions in association with a merchant account associated with the user. The set of merchant information may be dynamically updated to add or remove merchant accounts associated with the user. Since the payment card according to some embodiments is configured to only initiate payments, purchases, or financial transactions with pre-authorized merchants, and only in regard to accounts at these pre-authorized merchants that are associated with the user, any person or device that gains unauthorized access to the user's payment card would only be able to complete purchases or payments regarding the user's own accounts. For example, the user may have an account with a local natural gas supply company, and therefore the local natural gas supply company may be designated as a pre-authorized merchant for the user's digital wallet and the user's payment card. In an instance in which the local natural gas supply company is the only merchant pre-authorized for the user's digital wallet and the user's payment card, both the user's digital wallet and the user's payment card are secured against any transaction with any other merchant, even with other merchants with which the user has a legitimate account. As such, even if the user's digital wallet or the user's payment card was accessed by an unauthorized person or device, the unauthorized person or device would only be able to make payments, from any of the user's stored payment methods, to the user's account with the local natural gas supply company. Other financial transactions, such as the transfer of funds to an external account, or even between the user's different payment methods stored at the digital wallet or on the payment card, the purchase of any product or service with any other merchant, or any other payments are completely disallowed, even by the user, no matter what authentication information or other authorization commands are provided.

According to some embodiments, the digital wallet and/or the payment card can be configured such that additional merchants and/or additional user account with merchants can only be authorized for the digital wallet and/or the payment card through an authorization process that requires additional security measures such as two-factor authentication, biometric screening, or the like.

In another embodiment, an apparatus can be provided that is configured for secure payment processing, the apparatus comprising: one or more processors; and one or more memory devices storing program code, the one or more memory devices and the program code being configured, with the one or more processors, at least to: store, in a digital wallet associated with a user, information regarding one or more payment options associated with the user, and information regarding one or more merchant accounts associated with the user; receive a request to initiate a payment between the user and a payee; determine, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiate the payment to the particular merchant account according to one of the one or more payment options associated with the user. In some embodiments, the one or more memory devices and the program code are further configured, with the one or more processors, at least to: store user payment preferences associated with the one or more merchant accounts and the one or more payment options. In some embodiments, the one or more memory devices and the program code are further configured, with the one or more processors, at least to: determine, based upon at least the user payment preferences, a particular payment option from among the one or more payment options to be used for the payment; and provide, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the one or more memory devices and the program code are further configured, with the one or more processors, at least to: store merchant transaction requirements associated with the one or more merchant accounts, the merchant transaction requirements comprising one of: one or more allowed types of payment source, or one or more disallowed types of payment source. In some embodiments, the one or more memory devices and the program code are further configured, with the one or more processors, at least to: determine, based upon at least the merchant transaction requirements, a particular payment option from among the one or more payment options to be use for the payment; and provide, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the one or more memory devices and the program code are further configured, with the one or more processors, at least to: in an instance in which the determination is in the affirmative, provide a notification to a user device or a device associated with said particular merchant account that the payment has been initiated. In some embodiments, the one or more memory devices and the program code are further configured, with the one or more processors, at least to: in an instance in which the determination is in the negative, provide a notification to a user device or a device associated with said particular merchant account that the payment is disallowed and refrain from initiating the payment with the payment processor.

In still another embodiment, an apparatus can be provided that is configured for secure payment processing, the apparatus comprising means, such as one or more processors and one or more memory devices storing program code, for storing, in a digital wallet associated with a user, information regarding one or more payment options associated with the user, and information regarding one or more merchant accounts associated with the user; means for receiving a request to initiate a payment between the user and a payee; means for determining, based upon at least the information regarding one or more merchant accounts associated with the user, whether the payee is associated with a particular merchant account of the one or more merchant accounts associated with the user; and means for, in an instance in which the payee is associated with a particular merchant account of the one or more merchant accounts associated with the user, initiating the payment to the particular merchant account according to one of the one or more payment options associated with the user. In some embodiments, the apparatus can further comprise means for storing user payment preferences associated with the one or more merchant accounts and the one or more payment options. In some embodiments, the apparatus can further comprise means for determining, based upon at least the user payment preferences, a particular payment option from among the one or more payment options to be used for the payment; and means for providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the apparatus can further comprise means for storing merchant transaction requirements associated with the one or more merchant accounts, the merchant transaction requirements comprising one of: one or more allowed types of payment source, or one or more disallowed types of payment source. In some embodiments, the apparatus can further comprise means for determining, based upon at least the merchant transaction requirements, a particular payment option from among the one or more payment options to be use for the payment; and means for providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the apparatus can further comprise means for, in an instance in which the determination is in the affirmative, providing a notification to a user device or a device associated with said particular merchant account that the payment has been initiated. In some embodiments, the apparatus can further comprise means for, in an instance in which the determination is in the negative, providing a notification to a user device or a device associated with said particular merchant account that the payment is disallowed and refraining from initiating the payment with the payment processor.

According to another embodiment, a method for secure payment processing can be carried out, the method comprising: storing, in a digital wallet associated with a user, information regarding one or more payment options associated with the user, and information regarding one or more merchant accounts associated with the user; receiving a request to initiate a payment between the user and a payee; determining, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiating the payment to the particular merchant account according to one of the one or more payment options associated with the user. In some embodiments, the method can further comprise: storing user payment preferences associated with the one or more merchant accounts and the one or more payment options. In some embodiments, the method can further comprise: determining, based upon at least the user payment preferences, a particular payment option from among the one or more payment options to be used for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the method can further comprise: storing merchant transaction requirements associated with the one or more merchant accounts, the merchant transaction requirements comprising one of: one or more allowed types of payment source, or one or more disallowed types of payment source. In some embodiments, the method can further comprise: determining, based upon at least the merchant transaction requirements, a particular payment option from among the one or more payment options to be use for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the method can further comprise: in an instance in which the determination is in the affirmative, providing a notification to a user device or a device associated with said particular merchant account that the payment has been initiated. In some embodiments, the method can further comprise: in an instance in which the determination is in the negative, providing a notification to a user device or a device associated with said particular merchant account that the payment is disallowed and refraining from initiating the payment with the payment processor.

According to still another embodiment, a computer program product can be provided that comprises a non-transitory computer readable medium storing program instructions, the program instructions being operable for causing at least: storing, in a digital wallet associated with a user, information regarding one or more payment options associated with the user, and information regarding one or more merchant accounts associated with the user; receiving a request to initiate a payment between the user and a payee; determining, based upon at least the information regarding one or more merchant accounts associated with the user, whether the payee is associated with a particular merchant account of the one or more merchant accounts associated with the user; and, in an instance in which the payee is associated with a particular merchant account of the one or more merchant accounts associated with the user, initiating the payment to the particular merchant account according to one of the one or more payment options associated with the user. In some embodiments, the program instructions are further operable for causing at least: storing user payment preferences associated with the one or more merchant accounts and the one or more payment options. In some embodiments, the program instructions are further operable for causing at least: determining, based upon at least the user payment preferences, a particular payment option from among the one or more payment options to be used for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the program instructions are further operable for causing at least: storing merchant transaction requirements associated with the one or more merchant accounts, the merchant transaction requirements comprising one of: one or more allowed types of payment source, or one or more disallowed types of payment source. In some embodiments, the program instructions are further operable for causing at least: determining, based upon at least the merchant transaction requirements, a particular payment option from among the one or more payment options to be use for the payment; and providing, to a payment processor, sufficient information regarding the particular payment option from among the one or more payment options to cause the payment processor to carry out a financial transfer between the particular payment option associated with the user and the particular merchant account of the one or more merchant accounts associated with the user. In some embodiments, the program instructions are further operable for causing at least: in an instance in which the determination is in the affirmative, providing a notification to a user device or a device associated with said particular merchant account that the payment has been initiated. In some embodiments, the program instructions are further operable for causing at least: in an instance in which the determination is in the negative, providing a notification to a user device or a device associated with said particular merchant account that the payment is disallowed and refrain from initiating the payment with the payment processor.

According to yet another embodiment, an apparatus can be provided that is configured for secure payment processing, the apparatus comprising: one or more processors; and one or more memory devices storing program code, the one or more memory devices and the program code being configured, with the one or more processors, at least to: store at least payor information, authentication information, and account information associated with a payor; store at least payee information associated with one or more payees; receive, from a payee device or a payor device, a request to initiate a payment, the request comprising the payor information, the payee information associated with a particular payee of the one or more payees, and payment information regarding the payment; determine, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiate the payment by providing the payment information regarding the payment, the payor information, the payee information associated with the particular payee of the one or more payees, the authentication information, the account information, and the payment information regarding the payment to a payment processor. In some embodiments, the one or more memory devices and the program code are further configured, with the one or more processors, at least to: in an instance in which the determination is in the affirmative, provide a notification to the payee device or the payor device that the payment has been initiated. In some embodiments, the one or more memory devices and the program code are further configured, with the one or more processors, at least to: in an instance in which the determination is in the negative, provide a notification to the payee device or the payor device that the payment is disallowed and refrain from initiating the payment with the payment processor.

According to another embodiment, an apparatus can be provided that is configured for secure payment processing, the apparatus comprising means, such as one or more processors and one or more memory devices storing program code, for storing at least payor information, authentication information, and account information associated with a payor; means for storing at least payee information associated with one or more payees; means for receiving, from a payee device or a payor device, a request to initiate a payment, the request comprising the payor information, the payee information associated with a particular payee of the one or more payees, and payment information regarding the payment; means for determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and means for, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the apparatus can further comprise means for, in an instance in which the determination is in the affirmative, providing a notification to the payee device or the payor device that the payment has been initiated. In some embodiments, the apparatus can further comprise means for, in an instance in which the determination is in the negative, providing a notification to the payee device or the payor device that the payment is disallowed and refrain from initiating the payment with the payment processor.

According to still another embodiment, a method can be carried out that comprises: storing at least payor information, authentication information, and account information associated with a payor; storing at least payee information associated with one or more payees; receiving, from a payee device or a payor device, a request to initiate a payment, the request comprising the payor information, the payee information associated with a particular payee of the one or more payees, and payment information regarding the payment; determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the method can further comprise: in an instance in which the determination is in the affirmative, providing a notification to the payee device or the payor device that the payment has been initiated. In some embodiments, the method can further comprise: in an instance in which the determination is in the negative, providing a notification to the payee device or the payor device that the payment is disallowed and refraining from initiating the payment with the payment processor.

According to yet another embodiment, a computer program product can be provided that comprises a non-transitory computer readable medium storing program instructions, the program instructions being operable for causing at least: storing at least payor information, authentication information, and account information associated with a payor; storing at least payee information associated with one or more payees; receiving, from a payee device or a payor device, a request to initiate a payment, the request comprising the payor information, the payee information associated with a particular payee of the one or more payees, and payment information regarding the payment; determining, based at least upon the payor information, the payee information associated with a particular payee of the one or more payees, the authentication information, the account information, and payment information regarding the payment, and further based upon one of payor preferences or payee preferences, whether the payment is with a pre-approved payee from among the one or more payees; and, in an instance in which the determination is in the affirmative, initiating the payment by providing the payment information regarding the payment, the payor information, the payee information associated with the particular payee of the one or more payees, the authentication information, the account information, and the payment information regarding the payment to a payment processor. In some embodiments, the program instructions are further operable for causing at least: in an instance in which the determination is in the affirmative, providing a notification to the payee device or the payor device that the payment has been initiated. In some embodiments, the program instructions are further operable for causing at least: in an instance in which the determination is in the negative, providing a notification to the payee device or the payor device that the payment is disallowed and refraining from initiating the payment with the payment processor.

According to another embodiment, an apparatus can be provided that is configured for secure payment processing, the apparatus comprising: one or more processors; and one or more memory devices storing program code, the one or more memory devices and the program code being configured, with the one or more processors, at least to: store, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receive a request to initiate a payment between the user and the merchant, the request comprising at least: an indication of a payor, an indication of a payee, and a payment amount; determine, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiate the payment. In some embodiments, the one or more memory devices and the program code are further configured, with the one or more processors, at least to: in an instance in which the determination is in the affirmative, automatically initiate the payment by providing at least a portion of the set of digital wallet data stored in the digital wallet and the payment amount to a payment processor. In some embodiments, the one or more memory devices and the program code are further configured, with the one or more processors, at least to: in an instance in which the determination is in the affirmative, provide a notification to one or both of a user device associated with the payor or a merchant device associated with the payee that the payment has been initiated. In some embodiments, the one or more memory devices and the program code are further configured, with the one or more processors, at least to: in an instance in which the determination is in the negative, provide a notification to one or both of a user device associated with the payor or a merchant device associated with the payee that the payment is disallowed and refrain from initiating the payment with the payment processor.

According to still another embodiment, an apparatus can be provided that is configured for secure payment processing, the apparatus comprising means, such as one or more processors and one or more memory devices storing program code, for storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; means for receiving a request to initiate a payment between the user and the merchant, the request comprising at least: an indication of a payor, an indication of a payee, and a payment amount; means for determining, based at least upon the indication of the payor, the indication of the payee, and the set of digital wallet data stored in the digital wallet, whether the payment being requested is to a pre-approved merchant account from among the plurality of merchant accounts; and means for, in an instance in which the determination is in the affirmative, automatically initiating the payment. In some embodiments, the apparatus can further comprise: means for, in an instance in which the determination is in the affirmative, automatically initiating the payment by providing at least a portion of the set of digital wallet data stored in the digital wallet and the payment amount to a payment processor. In some embodiments, the apparatus can further comprise: means for, in an instance in which the determination is in the affirmative, providing a notification to one or both of a user device associated with the payor or a merchant device associated with the payee that the payment has been initiated. In some embodiments, the apparatus can further comprise: means for, in an instance in which the determination is in the negative, providing a notification to one or both of a user device associated with the payor or a merchant device associated with the payee that the payment is disallowed and refraining from initiating the payment with the payment processor.

According to another embodiment, a method for secure payment processing can be carried out, the method comprising: storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receive a request to initiate a payment between the user and the merchant, the request comprising at least: an indication of a payor, an indication of a payee, and a payment amount; determining, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiating the payment. In some embodiments, the method can further comprise: in an instance in which the determination is in the affirmative, automatically initiating the payment by providing at least a portion of the set of digital wallet data stored in the digital wallet and the payment amount to a payment processor. In some embodiments, the method can further comprise: in an instance in which the determination is in the affirmative, providing a notification to one or both of a user device associated with the payor or a merchant device associated with the payee that the payment has been initiated. In some embodiments, the method can further comprise: in an instance in which the determination is in the negative, providing a notification to one or both of a user device associated with the payor or a merchant device associated with the payee that the payment is disallowed and refraining from initiating the payment with the payment processor.

According to still another embodiment, a computer program product can be provided that comprises a non-transitory computer readable medium storing program instructions, the program instructions being operable for causing at least: storing, in a digital wallet associated with a user, a set of digital wallet data associated with the user, the set of digital wallet data comprising: a full name of the user, a billing address of the user, account numbers and authentication indicia associated with a plurality of merchant accounts associated with the user, authentication information associated with the plurality of merchant accounts associated with the user, and at least one of: one or more account numbers and one or more routing numbers associated with one or more bank accounts associated with the user, a card number, an account number, and a card verification value associated with a credit card or a debit card associated with the user, or one or more account numbers and authentication indicia associated with one or more cryptocurrency accounts associated with the user; receiving a request to initiate a payment between the user and the merchant, the request comprising at least: an indication of a payor, an indication of a payee, and a payment amount; determining, based at least upon the indication of the payor, the indication of the payee, and the set of digital wallet data stored in the digital wallet, whether the payment being requested is to a pre-approved merchant account from among the plurality of merchant accounts; and, in an instance in which the determination is in the affirmative, automatically initiating the payment. In some embodiments, the program instructions are further operable for causing at least: in an instance in which the determination is in the affirmative, automatically initiating the payment by providing at least a portion of the set of digital wallet data stored in the digital wallet and the payment amount to a payment processor. In some embodiments, the program instructions are further operable for causing at least: in an instance in which the determination is in the affirmative, providing a notification to one or both of a user device associated with the payor or a merchant device associated with the payee that the payment has been initiated. In some embodiments, the program instructions are further operable for causing at least: in an instance in which the determination is in the negative, providing a notification to one or both of a user device associated with the payor or a merchant device associated with the payee that the payment is disallowed and refraining from initiating the payment with the payment processor.

The systems and methods disclosed herein present invention provide a consolidated view of the bifurcated digital wallet, whereby the user gets no visibility to the underlying bifurcation of storing the data in a plurality of different data stores. Though the present disclosure describes the method and system for executing a transaction, however, the method and system may be used in other situations as well where there is a need for securely procuring data from a plurality of sources as a single source does not store all the required information.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps. The preceding description has been presented with reference to various embodiments. Persons skilled in the art and technology to which this application pertains will appreciate that alterations and changes in the described structures and methods of operation can be practiced without meaningfully departing from the principle, spirit and scope.

What is claimed is:

1. An apparatus configured for secure payment processing, the apparatus comprising:
    one or more processors; and
    one or more memory devices storing program code, the one or more memory devices and the program code being configured, with the one or more processors, at least to:
        store, in a digital wallet associated with a user, information regarding a plurality of payment options associated with the user, information regarding a plurality of merchant accounts associated with the user, and information regarding a plurality of biller accounts associated with the user;
        receive, from a user device associated with the user, based on a first interaction by the user with a user interface of the user device, an indication that the user would like to initiate a transaction with a payee, the payee comprising one of a particular merchant or a particular biller;
        transmit, to the user device associated with the user, instructions to display, to the user, via the user interface of the user device, the plurality of payment options for completing the transaction with the payee;
        in response to a second interaction by the user with the user interface, determine the user has selected a preferred payment option from the plurality of payment options for completing the transaction with the payee;
        request, from the user device, transaction information, said transaction information comprising one of: merchant account information regarding the particular merchant account or biller account information regarding the particular biller account;
        receive, from the user device, the transaction information;
        store the transaction information in one of the one or more memory devices or the digital wallet associated with the user;
        determine, based upon at least the transaction information, the information regarding the plurality of merchant accounts associated with the user, and the information regarding the plurality of biller accounts associated with the user, by the one or more processors comparing the transaction information received from the user device to the information regarding the plurality of merchant accounts associated with the user and the information regarding the plurality of biller accounts associated with the user, whether the payee is associated with one of the plurality of merchant accounts or the plurality of biller accounts;
        in an instance in which the one or more processors determine that the payee is associated with one of the plurality of merchant accounts one of the plurality of biller accounts, determine that the payee is a pre-authorized merchant or a pre-authorized biller, and cause the apparatus to transmit a payment authorization signal to a payment processor to initiate the payment to the payee via the particular merchant account or the particular biller account using the preferred payment option chosen from among the plurality of payment options by the second interaction with the user interface of the user device, the payment authorization signal comprising:
            the transaction information received from the user device,
            information regarding the particular merchant account of the plurality of merchant accounts associated with the user or the particular biller account of the plurality of biller accounts associated with the user, and
            information regarding the preferred payment option; and
        in an instance in which the one or more processors determine that the payee is associated with an unaffiliated merchant account other than one of the plurality of merchant accounts or an unaffiliated biller account other than one of the plurality of biller accounts, determine that the payee is not a pre-authorized merchant and not a pre-authorized biller, and disallow initiation of the payment to the payee by causing the apparatus to refrain from transmitting the payment authorization signal to the payment processor.

2. The apparatus of claim 1, wherein the one or more memory devices and the program code are further configured, with the one or more processors, at least to:
    store user payment preferences associated with the plurality of merchant accounts, the plurality of biller accounts, or the plurality of payment options.

3. The apparatus of claim 2, wherein the one or more memory devices and the program code are further configured, with the one or more processors, at least to:
    determine, based upon at least the user payment preferences, the particular payment option from among the plurality of payment options to be used for the payment; and
    provide, to the payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

4. The apparatus of claim 1, wherein the one or more memory devices and the program code are further configured, with the one or more processors, at least to:

store merchant transaction requirements associated with the plurality of merchant accounts, the merchant transaction requirements comprising one of: one or more allowed types of payment source or one or more disallowed types of payment source; or store biller transaction requirements associated with the plurality of biller accounts, the biller transaction requirements comprising one or more of: one or more allowed types of payment source or one or more disallowed types of payment source.

5. The apparatus of claim 4, wherein the one or more memory devices and the program code are further configured, with the one or more processors, at least to:

determine, based upon at least the merchant transaction requirements or the biller transaction requirements, the particular payment option from among the plurality of payment options to be used for the payment; and provide, to a payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

6. The apparatus of claim 1, wherein the one or more memory devices and the program code are further configured, with the one or more processors, at least to:

in an instance in which the payee is associated with a particular merchant account of the plurality of merchant accounts associated with the user or a particular biller account of the plurality of biller accounts associated with the user, provide a notification to the user device that the payment has been initiated.

7. The apparatus of claim 1, wherein the one or more memory devices and the program code are further configured, with the one or more processors, at least to:

in an instance in which the payee is associated with an unaffiliated merchant account other than one of the plurality of merchant accounts associated with the user or an unaffiliated biller account other than one of the plurality of biller accounts associated with the user, provide a notification to the user device that the payment is disallowed.

8. A method for secure payment processing, the method comprising:

storing, using a payment initiation system comprising a processor and a memory, in a digital wallet associated with a user, information regarding a plurality of payment options associated with the user, information regarding a plurality of merchant accounts associated with the user, and information regarding a plurality of biller accounts associated with the user;

receiving, from a user device associated with the user, based on a first interaction by the user with a user interface of the user device, an indication that the user would like to initiate a transaction with a payee, the payee comprising one of a particular merchant associated with a particular merchant or a particular biller;

transmitting, to the user device associated with the user, instructions to display, to the user, via the user interface of the user device, the plurality of payment options for completing the transaction with the payee;

in response to a second interaction by the user with the user interface of the user device, determining the user has selected a preferred payment option from the plurality of payment options for a particular merchant account associated with the particular merchant or a particular biller account associated with the particular biller;

requesting from the user device, transaction information, said transaction information comprising one of: merchant account information regarding the particular merchant account or biller account information regarding the particular biller account;

receiving, at the payment initiation system, from the user device, in response to an input by the user at the user device, the transaction information;

storing, using the payment initiation system, in the memory of the payment initiation system or the digital wallet associated with the user, the transaction information;

determining, based upon at least the transaction information, the information regarding the plurality of merchant accounts associated with the user, and the information regarding the plurality of biller accounts associated with the user, by the payment initiation system comparing the transaction information received from the user device to the information regarding the plurality of merchant accounts and the information regarding the plurality of biller accounts, whether the payee is associated with one of the plurality of merchant accounts or the plurality of biller accounts;

in an instance in which the payment initiation system determines that the payee is associated with one of the plurality of merchant accounts or the plurality of biller accounts, determining that the payee is a pre-authorized merchant or a pre-authorized biller, and initiating, using the payment initiation system, the payment to the payee, via the particular merchant account or the particular biller account, according to the particular payment option chosen from among the plurality of payment options by the second interaction with the user interface of the user device, by causing the payment initiation system to transmit a payment authorization signal to a payment processor, the payment authorization signal comprising:

the transaction information received from the user device, information regarding the particular merchant account of the plurality of merchant accounts associated with the user or the particular biller account of the plurality of biller accounts associated with the user, and information regarding the preferred payment option; and in an instance in which the payment initiation system determines that the payee is associated with an unaffiliated merchant account other than one of the plurality of merchant accounts associated with the user or an unaffiliated biller account other than one of the plurality of biller accounts associated with the user, determining that the payee is not a pre-authorized merchant and not a pre-authorized biller, and disallowing initiation of the payment to the payee by causing the payment initiation system to refrain from transmitting the payment authorization signal to the payment processor.

9. The method of claim 8, further comprising:

storing user payment preferences associated with the plurality of merchant accounts, the plurality of biller accounts, or the plurality of payment options.

10. The method of claim 9, further comprising:
   determining, based upon at least the user payment preferences, the particular payment option from among the plurality of payment options to be used for the payment; and
   providing, to the payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

11. The method of claim 8, further comprising:
   storing merchant transaction requirements associated with the plurality of merchant accounts, the merchant transaction requirements comprising one of: one or more allowed types of payment source or one or more disallowed types of payment source; or
   storing biller transaction requirements associated with the plurality of biller accounts, the biller transaction requirements comprising one or more of: one or more allowed types of payment source or one or more disallowed types of payment source.

12. The method of claim 11, further comprising:
   determining, based upon at least the merchant transaction requirements or the biller transaction requirements, the particular payment option from among the plurality of payment options to be used for the payment; and
   providing, to a payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

13. The method of claim 8, further comprising:
   in an instance in which the payee is associated with a particular merchant account of the plurality of merchant accounts associated with the user or a particular biller account of the plurality of biller accounts associated with the user, providing a notification to the user device, a device associated with said particular merchant account, or a device associated with said particular biller account, that the payment has been initiated.

14. The method of claim 8, further comprising:
   in an instance in which the payee is associated with an unaffiliated merchant account other than one of the plurality of merchant accounts associated with the user or an unaffiliated biller account other than one of the plurality of biller accounts associated with the user, providing a notification to the user device that the payment is disallowed.

15. A non-transitory computer readable medium storing program instructions, the program instructions being operable for causing at least:
   storing, using a payment initiation system comprising a processor and a memory, in a digital wallet associated with a user, information regarding a plurality of payment options associated with the user, information regarding a plurality of merchant accounts associated with the user, and information regarding a plurality of biller accounts associated with the user;
   receiving, from a user device associated with the user, based on a first interaction by the user with a user interface of the user device, an indication that the user would like to initiate a transaction with a payee, the payee comprising one of a particular merchant associated with a particular merchant or a particular biller;
   transmitting, to the user device associated with the user, instructions to display, to the user, via the user interface of the user device, the plurality of payment options for completing the transaction with the payee;
   in response to a second interaction by the user with the user interface of the user device, determining the user has selected a preferred payment option from the plurality of payment options for a particular merchant account associated with the particular merchant or a particular biller account associated with the particular biller;
   requesting from the user device, transaction information, said transaction information comprising one of:
   merchant account information regarding the particular merchant account or biller account information regarding the particular biller account;
   receiving, at the payment initiation system, from the user device, in response to an input by the user at the user device, the transaction information;
   storing, using the payment initiation system, in the memory of the payment initiation system or the digital wallet associated with the user, the transaction information;
   determining, based upon at least the transaction information, the information regarding the plurality of merchant accounts associated with the user, and the information regarding the plurality of biller accounts associated with the user, by the payment initiation system comparing the transaction information received from the user device to the information regarding the plurality of merchant accounts and the information regarding the plurality of biller accounts, whether the payee is associated with one of the plurality of merchant accounts or the plurality of biller accounts;
   in an instance in which the payment initiation system determines that the payee is associated with one of the plurality of merchant accounts or the plurality of biller accounts, determining that the payee is a pre-authorized merchant or a pre-authorized biller, and initiating, using the payment initiation system, the payment to the payee, via the particular merchant account or the particular biller account, according to the particular payment option chosen from among the plurality of payment options by the second interaction with the user interface of the user device, by causing the payment initiation system to transmit a payment authorization signal to a payment processor, the payment authorization signal comprising:
      the transaction information received from the user device,
      information regarding the particular merchant account of the plurality of merchant accounts associated with the user or the particular biller account of the plurality of biller accounts associated with the user, and
      information regarding the preferred payment option; and
   in an instance in which the payment initiation system determines that the payee is associated with an unaffiliated merchant account other than one of the plurality of merchant accounts associated with the user or an unaffiliated biller account other than one of the plurality of biller accounts associated with the user, determining that the payee is not a pre-authorized merchant and not a pre-authorized biller, and disallowing initiation of the payment to the payee by causing the payment initiation system to refrain from transmitting the payment authorization signal to the payment processor.

16. The non-transitory computer readable medium of claim 15, wherein the program instructions are further operable for causing at least:
storing, in the memory of the payment initiation system or the digital wallet, user payment preferences associated with the plurality of merchant accounts, the plurality of biller accounts, or the plurality of payment options.

17. The non-transitory computer readable medium of claim 16, wherein the program instructions are further operable for causing at least:
causing the payment initiation system to determine, based upon at least the user payment preferences, the particular payment option from among the plurality of payment options to be used for the payment; and
providing, using the payment initiation system, to a payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

18. The non-transitory computer readable medium of claim 15, wherein the program instructions are further operable for causing at least:
storing, in the memory of the payment initiation system or the digital wallet, merchant transaction requirements associated with the plurality of merchant accounts, the merchant transaction requirements comprising one of: one or more allowed types of payment source or one or more disallowed types of payment source; or
storing, in the memory of the payment initiation system or the digital wallet, biller transaction requirements associated with the plurality of biller accounts, the biller transaction requirements comprising one or more of: one or more allowed types of payment source or one or more disallowed types of payment source.

19. The non-transitory computer readable medium of claim 18, wherein the program instructions are further operable for causing at least:
causing the payment initiation system to determine, based upon at least the merchant transaction requirements or the biller transaction requirements, a particular payment option from among the plurality of payment options to be used for the payment; and
providing, using the payment initiation system, to the payment processor, information regarding the particular payment option from among the plurality of payment options to cause the payment processor to carry out a financial transfer between the particular payment option associated with the user and the particular merchant account of the plurality of merchant accounts associated with the user or the particular biller account of the plurality of biller accounts associated with the user.

20. The non-transitory computer readable medium of claim 15, wherein the program instructions are further operable for causing at least:
in an instance in which the payee is associated with a particular merchant account of the plurality of merchant accounts associated with the user or a particular biller account of the plurality of biller accounts associated with the user, causing the payment initiation system to transmit a notification to the user device, a device associated with said particular merchant account, or a device associated with said particular biller account, that the payment has been initiated.

21. The non-transitory computer readable medium of claim 20, wherein the program instructions are further operable for causing at least:
in an instance in which the payee is associated with an unaffiliated merchant account other than one of the plurality of merchant accounts associated with the user or an unaffiliated biller account other than one of the plurality of biller accounts associated with the user, causing the payment initiation system to transmit a notification to the user device that the payment is disallowed.

22. An apparatus configured for secure payment processing, the apparatus comprising:
one or more processors; and
one or more memory devices storing program code, the one or more memory devices and the program code being configured, with the one or more processors, at least to:
store, in a digital wallet associated with a user, information regarding one or more payment options associated with the user, information regarding one or more merchant accounts associated with the user, and information regarding one or more biller accounts associated with the user;
receive, from a user device associated with the user, based on a first interaction by the user with a user interface of the user device, an indication that the user would like to initiate a transaction with a payee, the payee comprising one of a particular merchant or a particular biller;
transmit, to the user device associated with the user, instructions to display, to the user, via the user interface of the user device, the plurality of payment options for completing the transaction with the payee;
in response to a second interaction by the user with the user interface, determine that the user has selected a preferred payment option from the one or more payment options for completing the transaction with the payee;
request, from the user device, transaction information, said transaction information comprising one of: merchant account information for a particular merchant account associated with the particular merchant or biller account information for a particular biller account associated with the particular biller;
receive, from the user device, the transaction information;
store the transaction information in one of the one or more memory devices of the apparatus or in the digital wallet associated with the user;
determine, based upon at least the transaction information, the information regarding the one or more merchant accounts associated with the user, and the information regarding the one or more biller accounts associated with the user, by the one or more processors comparing the transaction information received from the user device to the information regarding the one or more merchant accounts associated with the user and the information regarding the one or more biller accounts associated with the user, whether the payee is associated with one of the one or more merchant accounts associated with the user or the one or more biller accounts associated with the payee;

in an instance in which the one or more processors determine that the payee is associated with one of the one or more merchant accounts associated with the user or one of the one or more biller accounts associated with the user, determine that the payee is a pre-authorized merchant or a pre-authorized biller, and cause the apparatus to transmit a payment authorization signal to a payment processor to initiate the payment to the payee via the particular merchant account or the particular biller account using the preferred payment option chosen from among the plurality of payment options by the second interaction with the user interface of the user device, the payment authorization signal comprising:

the transaction information received from the user device, information regarding the particular merchant account of the plurality of merchant accounts associated with the user or the particular biller account of the plurality of biller accounts associated with the user, and information regarding the preferred payment option; and in an instance in which the one or more processors determine that the payee is associated with an unaffiliated merchant account other than one of the one or more merchant accounts associated with the user or an unaffiliated biller account other than one of the one or more biller accounts associated with the user, determine that the payee is not a pre-authorized merchant and not a pre-authorized biller, and disallow initiation of the payment to the payee by causing the apparatus to refrain from transmitting the payment authorization signal to the payment processor.

23. The apparatus of claim 22, wherein the one or more memory devices and the program code are further configured, with the one or more processors, at least to:

receive, from the user device, in response to one or more other inputs by the user, user payment preferences associated with the one or more payment options and user payee preferences associated with at least one of the one or more merchant accounts or the one or more biller accounts.

24. The apparatus of claim 23, wherein the one or more memory devices and the program code are further configured, with the one or more processors, at least to:

determine, based upon at least the user payment preferences, the particular payment option from among the one or more payment options to be used for the payment; and provide, to a payment processor, information regarding the particular payment option from among the one or more payment options to cause the payment processor to carry out a financial transfer between the particular payment option associated with the user and the particular merchant account of the one or more merchant accounts associated with the user or the particular biller account of the one or more biller accounts associated with the user.

25. A method for secure payment processing, the method comprising:

storing, using a payment initiation system comprising a processor and a memory, in a digital wallet associated with a user, information regarding one or more payment options associated with the user, information regarding one or more merchant accounts associated with the user, and information regarding one or more biller accounts associated with the user;

receiving, from a user device associated with the user, based on a first interaction by the user with a user interface of the user device, an indication that the user would like to initiate a transaction with a payee, the payee comprising one of a particular merchant or a particular biller;

transmitting, to the user device associated with the user, instructions to display, to the user, via the user interface of the user device, the one or more payment options for completing the transaction with the payee;

in response to a second interaction by the user with the user interface, determining that the user has selected a preferred payment option from the one or more payment options for completing the transaction with the payee;

requesting, from the user device associated with the user, transaction information, said transaction information comprising one of: merchant account information for a particular merchant account associated with the particular merchant or biller account information for a particular biller account associated with the particular biller;

receiving, at the payment initiation system, from the user device, the transaction information;

storing, using the payment initiation system, in the memory of the payment initiation system or the digital wallet associated with the user, the transaction information;

determining, based upon at least the transaction information, the information regarding the one or more merchant accounts associated with the user, and the information regarding the one or more biller accounts associated with the user, by the payment initiation system comparing the transaction information received from the user device to the information regarding the one or more merchant accounts and the information regarding the one or more biller accounts, whether the payee is associated with one of the one or more merchant accounts or the one or more biller accounts;

in an instance in which the payment initiation system determines that the payee is associated with one of the one or more merchant accounts associated with the user or the one or more biller accounts associated with the user, determining that the payee is a pre-authorized merchant or a pre-authorized biller, and initiating the payment to the payee, via the particular merchant account or the particular biller account, using the preferred payment option chosen from among the plurality of payment options by the second interaction with the user interface of the user device by causing the payment initiation system to transmit a payment authorization signal to a payment processor, the payment authorization signal comprising:

the transaction information received from the user device, information regarding the particular merchant account of the one or more merchant accounts associated with the user or the particular biller account of the one or more biller accounts associated with the user, and information regarding the preferred payment option; and in an instance in which the payment initiation system determines that the payee is associated with an unaffiliated merchant account other than one of the one or more merchant accounts associated with the user or an unaffiliated biller account other than one of the one or more biller accounts associated with the user, determining that the payee is not a pre-authorized merchant and not a pre-authorized biller, and disallowing initiation of the payment to the payee by causing the payment initiation system to refrain from transmitting the payment authorization signal to the payment processor.

26. The method of claim 25, further comprising:

receiving, at the payment initiation system, from the user device, in response to one or more other inputs by the user, user payment preferences associated with the one or more payment options and user payee preferences associated with at least one of the one or more merchant accounts or the one or more biller accounts.

27. The method of claim 26, further comprising:

determining, based upon at least the user preferences, the particular payment option from among the one or more payment options to be used for the payment; and providing, to the payment processor, information regarding the particular payment option from among the one or more payment options to cause the payment processor to carry out a financial transfer between the particular payment option associated with the user and the particular merchant account of the one or more merchant accounts associated with the user or the particular biller account of the one or more biller accounts associated with the user.

28. A non-transitory computer readable medium storing program instructions, the program instructions being operable for causing at least:

storing, using a payment initiation system comprising a processor and a memory, in a digital wallet associated with a user, information regarding one or more payment options associated with the user, information regarding one or more merchant accounts associated with the user, and information regarding one or more biller accounts associated with the user;

receiving, from a user device associated with the user, based on a first interaction by the user with a user interface of the user device, an indication that the user would like to initiate a transaction with a payee, the payee comprising one of a particular merchant or a particular biller;

transmitting, to the user device associated with the user, instructions to display, to the user, via the user interface of the user device, the one or more payment options for completing the transaction with the payee;

in response to a second interaction by the user with the user interface, determining that the user has selected a preferred payment option from the one or more payment options for completing the transaction with the payee;

requesting, from the user device associated with the user, transaction information, said transaction information comprising one of: merchant account information for a particular merchant account associated with the particular merchant or biller account information for a particular biller account associated with the particular biller;

receiving, at the payment initiation system, from the user device, the transaction information;

storing, using the payment initiation system, in the memory of the payment initiation system or the digital wallet associated with the user, the transaction information;

determining, based upon at least the transaction information, the information regarding the one or more merchant accounts associated with the user, and the information regarding the one or more biller accounts associated with the user, by the payment initiation system comparing the transaction information received from the user device to the information regarding the one or more merchant accounts and the information regarding the one or more biller accounts, whether the payee is associated with one of the one or more merchant accounts or the one or more biller accounts;

in an instance in which the payment initiation system determines that the payee is associated with one of the one or more merchant accounts associated with the user or the one or more biller accounts associated with the user, determining that the payee is a pre-authorized merchant or a pre-authorized biller, and initiating the payment to the payee, via the particular merchant account or the particular biller account, using the preferred payment option chosen from among the plurality of payment options by the second interaction with the user interface of the user device by causing the payment initiation system to transmit a payment authorization signal to a payment processor, the payment authorization signal comprising:

the transaction information received from the user device, information regarding the particular merchant account of the one or more merchant accounts associated with the user or the particular biller account of the one or more biller accounts associated with the user, and information regarding the preferred payment option; and in an instance in which the payment initiation system determines that the payee is associated with an unaffiliated merchant account other than one of the one or more merchant accounts associated with the user or an unaffiliated biller account other than one of the one or more biller accounts associated with the user, determining that the payee is not a pre-authorized merchant and not a pre-authorized biller, and disallowing initiation of the payment to the payee by causing the payment initiation system to refrain from transmitting the payment authorization signal to the payment processor.

29. The non-transitory computer readable medium of claim 28, wherein the non-transitory computer readable medium further stores program instructions that are operable for causing at least:

receiving, from the user device, in response to one or more other inputs by the user, user payment preferences associated with the one or more payment options and user payee preferences associated with at least one of the one or more merchant accounts or the one or more biller accounts.

30. The non-transitory computer readable medium of claim 29, wherein the non-transitory computer readable medium further stores program instructions that are operable for causing at least:
- determining, based upon at least the user payment preferences, the particular payment option from among the one or more payment options to be used for the payment; and
- providing, to the payment processor, information regarding the particular payment option from among the one or more payment options to cause the payment processor to carry out a financial transfer between the particular payment option associated with the user and the particular merchant account of the one or more merchant accounts associated with the user or the particular biller account of the one or more biller accounts associated with the user.

* * * * *